US00RE37488B1

(19) United States
(12) Reissued Patent
Broomhead et al.

(10) Patent Number: US RE37,488 E
(45) Date of Reissued Patent: Dec. 25, 2001

(54) HEURISTIC PROCESSOR

(75) Inventors: David Sydney Broomhead; Robin Jones; Terence John Shepherd; John Graham McWhirter, all of Worcestershire (GB)

(73) Assignee: The Secretary of State for Defence in Her Majesty's Government of the United Kingdom of Great Britain and Northern Ireland (GB)

(21) Appl. No.: 08/769,119

(22) PCT Filed: Jan. 31, 1990

(86) PCT No.: PCT/GB90/00142

§ 371 Date: Sep. 12, 1991

§ 102(e) Date: Sep. 12, 1991

(87) PCT Pub. No.: WO90/09643

PCT Pub. Date: Aug. 23, 1990

Related U.S. Patent Documents

Reissue of:
(64) Patent No.: 5,377,306
Issued: Dec. 27, 1994
Appl. No.: 07/761,899
Filed: Sep. 12, 1991

(30) Foreign Application Priority Data

Feb. 10, 1989 (GB) ..... 8903091

(51) Int. Cl.[7] ..... G06F 15/18
(52) U.S. Cl. ..... 706/14; 706/41; 706/27
(58) Field of Search ..... 395/20, 23, 27, 395/24; 706/41, 14, 27

(56) References Cited

U.S. PATENT DOCUMENTS 4,727,503 * 2/1988 McWhirter ..... 708/200
4,893,255 * 1/1990 Tomlinson, Jr. ..... 706/35
5,018,065 * 5/1991 McWirter et al. ..... 395/800.19

OTHER PUBLICATIONS

Joshua Alspector, "A Neuromorphic VLSI Learning System", Advanced Research in VLSI, MIT Press, 1987.*
Military Microwaves '88, Jul. 1988, "The Experimental Varification of the Performance of a Systolic Array Adaptive Processor" Hargrave et al, pp. 521–526.*
Jet Propulsion Laboratory, Moopenn et al, "A Neural Network for Euclidean Distance Minimization", II–34–9–II 356.*

* cited by examiner

*Primary Examiner*—George B. Davis
(74) *Attorney, Agent, or Firm*—Nixon & Vanderhye P.C.

(57) ABSTRACT

A heuristic processor incorporates a digital arithmetic unit arranged to compute the squared norm of each member of a training data set with respect to each member of a set of centers, and to transform the squared norms in accordance with a nonlinear function to produce training $\underline{\phi}$ vectors. A systolic array arranged for QR decomposition and least mean squares processing forms combinations of the elements of each $\underline{\phi}$ vector to provide a fit to corresponding training answers. The form of combination is then employed with like-transformed to provide estimates of unknown result. The processor is applicable to provide estimated results for problems which are nonlinear and for which explicit mathematical formalisms are unknown.

33 Claims, 8 Drawing Sheets

Fig.1Cont.
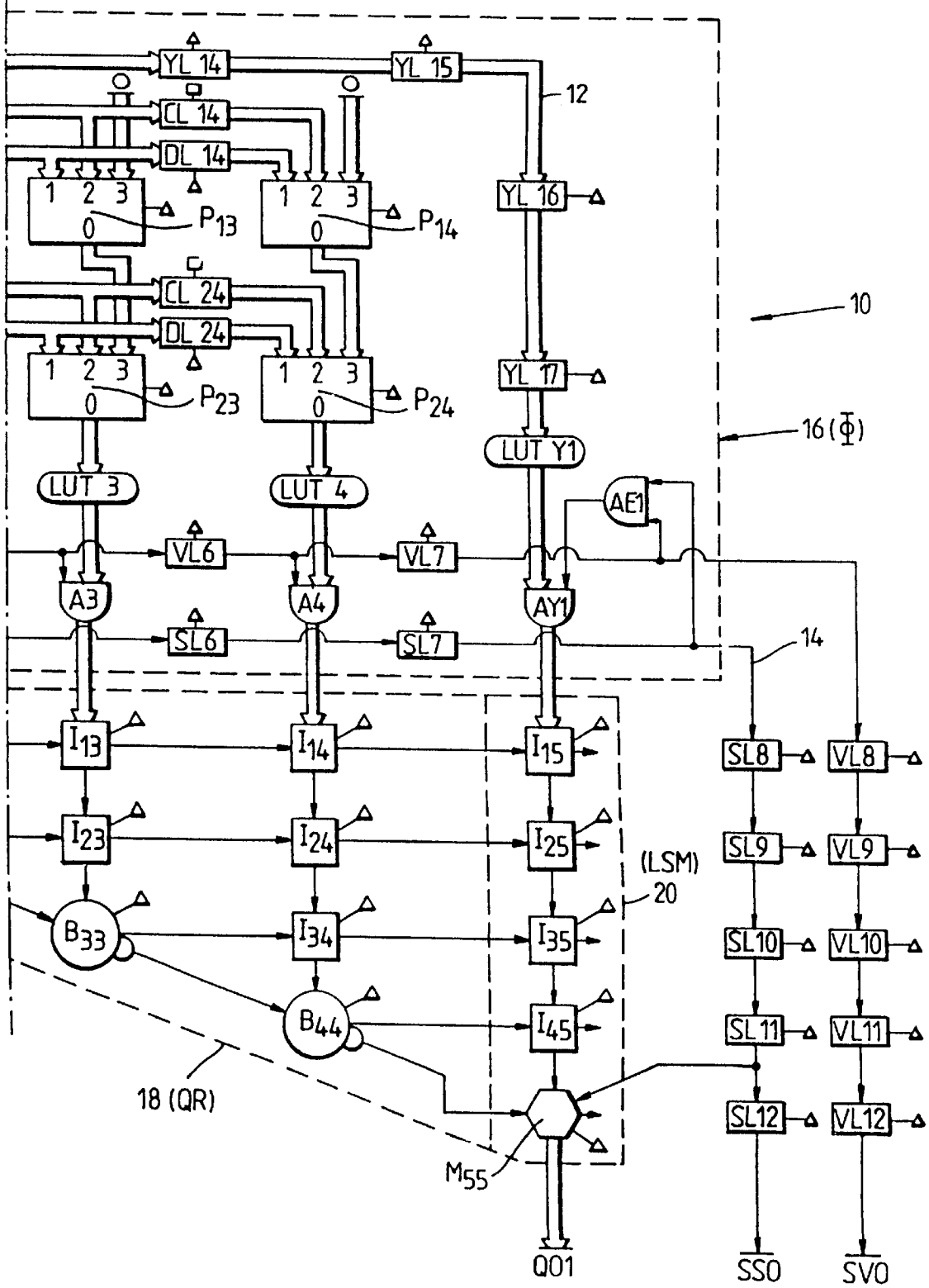

Fig.2.

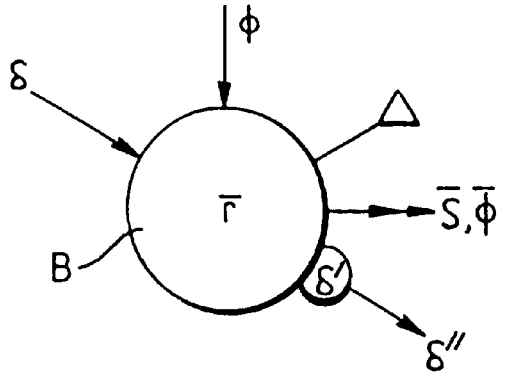

$\bar{r}' \leftarrow \bar{r} + \delta\phi^2; \bar{\phi} \leftarrow \phi; \delta'' \leftarrow \delta'$ IF $\bar{r}' = 0$, THEN $\bar{S} = \delta' = 0$;

IF $\bar{r}' \neq 0$, THEN $\bar{S} \leftarrow \delta\phi/\bar{r}'$

AND $\delta' \leftarrow \delta\bar{r}/\bar{r}'$

FINALLY, $\bar{r} \leftarrow \bar{r}'$

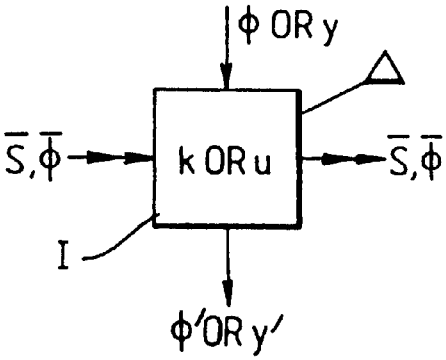

$\phi' \leftarrow \phi - \bar{\phi}k$; OR $y' \leftarrow y - \bar{\phi}u$ $k' \leftarrow k + \bar{S}\phi'$; OR $u' \leftarrow u + \bar{S}y'$ $k \leftarrow k'$; OR $u \leftarrow u'$

QR CELLS $I_{12}$ TO $I_{34}$ LSM CELLS $I_{15}$ TO $I_{45}$

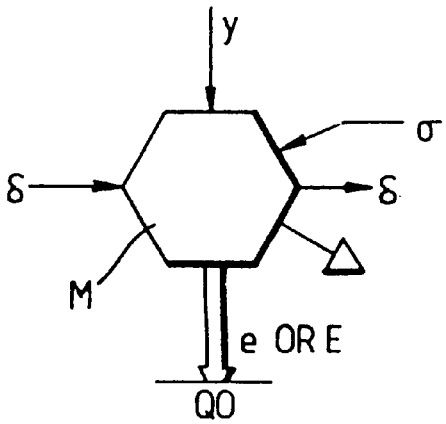

FOR $\sigma = 1$, $e \leftarrow \delta y$

FOR $\sigma = 0$, $E \leftarrow y$ p3
p2
p1
INVERTER
32
30
ADDER ARRAY
$V_{CC}$
$C_{IN}$
SUBTRACTOR
SQUARER
34
36
ADDER ARRAY
OUTPUT LATCH ARRAY
38
p0

HEURISTIC PROCESSOR

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to an heuristic processor, i.e. a digital processor designed to estimate unknown results by an empirical self-learning approach based on knowledge of prior results.

2. Discussion of Prior Art

Heuristic digital processors an not known per se in the prior art although there has been considerable interest in the field for many years. Such a processor is required to address problems for which no explicit mathematical formalism exists to permit emulation by an array of digital arithmetic circuits. A typical problem is the recognition of human speech, where it is required to deduce an implied message from speech which is subject to distortion by noise and the personal characteristics of the speaker. In such a problem, it will be known that a particular set of sound sequences will correspond to a set of messages, but the mathematical relationship between any sound sequence and the related message will be unknown. Under these circumstances, there is no direct method of discerning an unknown message from a new sound sequence.

The approach to solving problems lacking known mathematical formalisms has in the past involved use of a general purpose computer programmed in accordance with a self-learning algorithm. One form of algorithm is the so-called linear perception model. This model employs what may be referred to as training information from which the computer "learns", and on the basis of which it subsequently predicts. The information comprises "training data" sets and "training answer" sets to which the training data sets respectively correspond in accordance with the unknown transformation. The linear perception model involves forming differently weighted linear combinations of the training data values in a set to form an output result set. The result set is then compared with the corresponding training answer set to produce error values. The model can be envisaged as a layer of input nodes broadcasting data via varying strength (weighted) connections to a layer of summing output nodes. The model incorporates an algorithm to operate on the error values and provide corrected weighting parameters which (it is hoped) reduce the error values. This procedure is carried out for each of the training data and corresponding training answer set, after which the error values should become small indicating convergence.

At this point data for which there are no known answers are input to the computer, which generates predicted results on the basis of the weighting scheme it has built up during the training procedure. It can be shown mathematically that this approach is valid and yields convergent results for problems where the unknown transformation is linear. The approach is described in Chapter 8 of "Parallel Distributed Processing Vol. 1: Foundations", pages 318–322, D. E. Rumelhart, J. L. McClelland, MIT Press 1986.

For problems involving unknown nonlinear transformations, the linear perception model produce results which are quite wrong. A convenient test for such a model is the EX-OR problem, i.e. that of producing an output map of a logical exclusive-OR function. The linear perception model has been shown to be entirely inappropriate for the EX-OR problem because the latter is known to be nonlinear. In general, nonlinear problems are considerably more important than linear problems.

In an attempt to treat nonlinear problems, the linear perception model has been modified to introduce non-linear transformations and at least one additional layer of nodes referred to as a hidden layer. This provides the nonlinear multilayer perception model. It may be considered as a layer of input nodes broadcasting data via varying strength (weighted) connections to a layer of internal or "hidden" summing nodes, the hidden nodes in turn broadcasting their sums to a layer of output nodes via varying strength connections once more. (More complex versions may incorporate a plurality of successive hidden layers.) Nonlinear transformations may be performed at any one or more layers. A typical transformation involves computing the hyperbolic tangent of the input to a layer. Apart from these one or more transformations, the procedure is similar to the linear equivalent. Errors between training results and training answers are employed to recompute weighting factors applied to inputs to the hidden and output layers of the perception. The disadvantages of the nonlinear perception approach are that there is no guarantee that convergence is obtainable, and that where convergence is obtainable that it will occur in a reasonable length of computer time. The computer programme may well converge on a false minimum remote from a realistic solution to the weight determination problem. Moreover, convergence takes an unpredictable length of computer time, anything from minutes to many hours. It may be necessary to pass many thousands of training data sets through the computer model.

SUMMARY OF THE INVENTION

It is an object of the invention to provide an heuristic processor.

The present invention provides an heuristic processor including:

(1) transforming means arranged to produce a respective training $\underline{\phi}$ vector from each member of a training data set on the basis of a set of centres, each element of a $\underline{\phi}$ vector consisting of a nonlinear transformation of the norm of the displacement of the associated training data set member from a respective centre set member (2) processing means arranged to combine training $\underline{\phi}$ vector elements in a manner producing a fit to a set of training answers, and (3) means for generating result estimate values each consisting of a combination of the elements of a respective $\underline{\phi}$ vector produced from test data, each combination being at least equivalent to a summation of vector elements weighted in accordance with the training fit.

The invention provides the advantage that it constitutes a processing device capable of providing estimated results for nonlinear problems. In a preferred embodiment, the processing means is arranged to carry out least squares fitting to training answers. In this form, it produces convergence to the best result available having regard to the choice of nonlinear transformation and set of centres.

The processing means preferably comprises a network of processing cells; the cells are connected to form rows and columns and have functions appropriate to carry out QR decomposition of a $\underline{\phi}$ matrix having rows comprising input training data $\underline{\phi}$ vector. The network is also arranged to rotate input training answers as through each extended the training data $\phi$ vector to which it corresponds, in this form, the network comprises boundary cells constituting an array diagonal and providing initial row elements. The rows also contain numbers of internal cells diminishing by one per row down the array such that the lowermost boundary cell is associated with one internal cell per dimension of the training answer set. This provides a triangular array of columns including or consisting of boundary cells together with at least one column of internal cells. The boundary and internal cells have nearest neighbour (row and column interconnection, and the boundary cells are connected together in series along the array diagonal. Rotation parameters are evaluated by boundary cells from data input from above, and are passed along rows for use by internal cells to rotate input data. First row boundary and internal cells receive respective elements of each $\phi$ vector extended by a corresponding training answer and subsequent rows receive rotated versions thereof via array column interconnections. The triangular array receives input of $\phi$ vector elements and the associated internal cell column or columns receive training answer elements. Each boundary or internal cell computes and stores a respective updated decomposition matrix element in the process of producing or applying rotation parameters. The systolic array may include one multiplier cell per dimension of the training answer set, the multiplier cells being arranged to multiply rotated training answers by cumulatively multiplied cosine rotation parameters of their square-root free equivalents computed from $\phi$ vector elements to which each respective training answer corresponds. The multiplier cells provide error values indicating least squares fitting accuracy.

The processing means may include switching means for switching between a training mode of operation and a test mode. The switching means provides means for generating result estimate values. In the training mode, boundary and internal cells respectively generate and apply rotation parameters and update their stored elements as aforesaid. In the test mode, stored element update is suppressed, and training data $\phi$ vector input is replaced by input of like transformed test data, and training answer input is replaces by zero. The processing means then provides result estimates consisting of test data $\phi$ vector elements combined in a like manner to that which fitted training data $\phi$ vector elements to training answers.

The transforming means may comprise a digital arithmetic unit arranged to subtract training data vector elements form each of a series of corresponding centre vector elements, to square and add the resulting differences to provide sums arising from each data vector centre vector pair; and to transform the sums in accordance with a nonlinear function to provide $\phi$ vector elements.

BRIEF DESCRIPTION OF THE DRAWINGS

Embodiments of the invention will now be described, by way of example only, with reference to the accompanying drawings, in which:

FIG. 2 provides processing functions for cells of the FIG. 1 processor;

DETAILED DISCUSSION OF PREFERRED EMBODIMENTS

Figure 1:
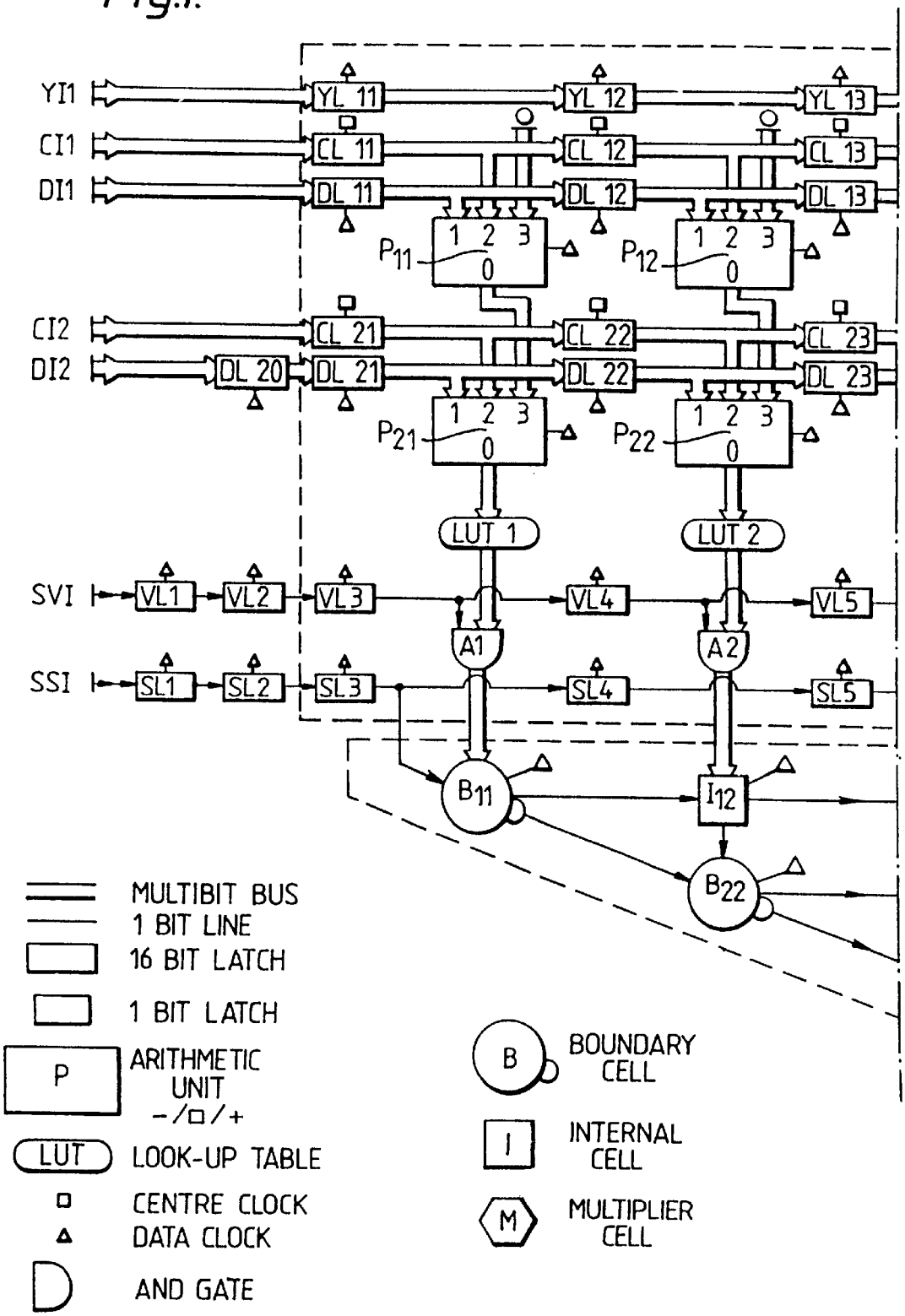
FIG. 1 is a block diagram of an heuristic processor of the invention.

Referring to FIG. 1, there is shown an heuristic processor of the invention indicated generally by 10. The processor 10 incorporates eight arithmetic units P arranged in two rows and four columns and designated $P_{11}$ to $P_{24}$, $P_{ij}$(i=1 or 2,j=1 to 4) indicating the ith row, jth column unit. Absence of indices ij indicates any or all units P. The units P have three inputs 1, 2 and 3 and one output 0. In the following description $P_{ij}^{k}$(k=0, 1, 2 or 3) will indicate the corresponding output or input of unit $P_{ij}$. The units P are each arranged to compute the square of the difference between sixteen-bit signals at inputs $P^1$ and $P^2$, and to add the square to a twenty-bit signal at input $P^3$. The twenty-bit result is stored in a latch (not shown) within each unit P, which is clocked by a data clock indicated by a $\Delta$ symbol to transfer it to output at $P^0$. The units P will be described in more detail later.

The processor 10 has multibit interconnection buses of sixteen, twenty or thirty-two bits (as individually required), each being indicated by a cloudy spaced pair of lines such as 12. The processor 10 also has single-bit connections such as 14 indicated by single how. These connections are unreferenced for the most part to reduce illustration complexity.

The third inputs $P_{2j}^{3}$(j=1 to 4) of the second row units $P_{2j}$ are connected to the outputs $P_{1j}^{0}$ of respective first row units $P_{ij}$. The first row units' third inputs $P_{ij}^{3}$ are connected to zero as indicated, and are in fact redundant in the present example. The redundant structure is illustrated to indicate capability of extension to any number of rows required for particular problems.

The first row arithmetic units $P_{11}$ to $P_{14}$ have second inputs $P_{1j}^{2}$(j=1 to 4) connected to respective points of a first chain of data latches DL11 to DL14 connected to a first data input D11. Each of the first row units $P_{11}$ to $P_{14}$ receive signals from the respective points on a first chain of data latches DL11 to DL14 connected to a first data input D11. Each of the first row units $P_{11}$ to $P_{14}$ receives signals from the respective centre and data latches above and to its left, i.e. unit $P_{1j}$ receives input from latches CL1j and DL1j.

Similarly, the second row arithmetic units have first and second inputs $P_{2j}^{1}$ and $P_{2j}^{2}$(j=1 to 4)connected via chains of centre and data latches CL21 to CL24 and DL20 to DL24 to second centre and data inputs C12 and D12 respectively. As compared to the first row, the second row data latch chain includes an extra latch DL20.

The centre and data latches CL11 to CL24 and DL20 to DL24 are sixteen-bit devices, and are clocked by centre and data clocks indicated by □ and $\Delta$ symbols respectively. Generally, the jth centre and data latches in the ith row, i.e. latches CLij and DLij, provide signals for subtraction in arithmetic unit $P_{ij}$. The additional second row data latch DL20 is provided to apply a temporal skew to input data, as will be described later.

The second row arithmetic unit outputs $P_{21}^{0}$ to $P_{24}^{0}$ are connected to respective read only memories (ROW LUT1 to LUT4. The memories LUT1 to LUT4 awe look-up tables arranged to output a negative exponent exp(−A/10) in response to an input address A. Each accepts a twenty-bit input in fixed binary point format and provides a thirty-two bit output in floating point format. The output incorporates an eight-bit exponent and a twenty-four bit mantissa, in accordance with the ANSI-IEEE-754-1985 standard.

The look-up tables LUT1 to LUT4 provide first input signals (of thirty-two bits) to respective AND gates A1 to A4. A further AND gate AY1 receives a thirty-two bit first input from a further memory LUTY1. This memory converts a sixteen-bit address input in fixed point format to the aforesaid thirty-two bit floating point output format of like magnitude. The LUTY1 is connected to a training answer input YI1 via a chain of seven sixteen-bit latches YL11 to YL17. (Other examples of the invention may incorporate additional training answer inputs YI2, Y13 . . . with associated latch chains YL21 . . . YL31 . . . , and gates AY2 . . . , hence the use of the redundant digit 1 in YI1 etc.)

The processor 10 includes a one-bit signal validity input SVI connected to a signal validity output SVO via a chain of twelve one-bit validity latches VL1 to VL12. It also has a signal status input SSI connected to a signal status output SSO via a further chain of twelve one-bit status latches SL1 to SL12. The validity and status latches VL1 to VL12 and SL1 to SL12 are clocked by the data clock Δ. The chain of validity latches supplies one-bit second inputs to the AND gates Al to A4; i.e. the output from the ith validity latch VLi is connected to AND gate Ai–2(i=3 to 6). Outputs from the seventh validity and status latches VL7 and SL7 are fed as one-bit inputs to an output enable AND gate AE1, which furnishes a one-bit second input signal to AND gate AY1.

Each of the latch chains YL11 to YL17, CL11 to CL14, DL11 to DL14, CL21 to CL24, DL20 to DL24, VL1 to VL12 and SL1 to SL12 may be implemented as a shift register. Each such shift register would then require only one clock input signal. "D" type edge triggered registers are suitable for this purpose.

For ease of subsequent reference, elements previously defined, other than inputs YI1 to SSI, and latches DL20, VL1, VL2, SL1 SL2, VL8 to VL12 and SL8 to S12 and outputs SVO and SSO are defined as forming a ϕ processor 16 indicated within chain lines.

The AND gates A1 to A4 of the Φ processor 16 provide thirty-two bit floating point inputs to a QR decomposition processor 18 indicated within a triangle of chain lines. The AND gate AY1 provides like input to a least squares minimisation (LSM) processor column 20 indicated within a rectangle of chain lines and to which the QR processor 18 is connected.

The QR processor 18 and the LSM processor 20 collectively comprise boundary cells $B_{11}$ to $B_{44}$ internal cells $I_{12}$ to $I_{45}$ and a multiplier Cell $M_{55}$ arranged in rows and columns with nearest-neighbour (row and column) interconnections which are single-bit. The reference scheme is that processing cell $X_{ij}$(X=B, I or M, ij=1 to 5) is the jth cell in the ith row. The first four rows to 5) is the jth cell in the ith row. The first rows begin with a boundary cell $B_{ij}$(i=1 to 4), and include numbers of internal cells $I_{12}$ etc diminishing in number from four to one by one per row. Boundary cells $B_{22}$ to $B_{44}$ terminate the second to fourth columns. The fifth row contains the multiplier cell $M_{55}$ only. The cells are all clocked by the data clock Δ.

The boundary cells $B_{11}$ to $B_{44}$ are interconnected via single-bit lines forming a diagonal of the QR processor. Each of the boundary cells incorporates a diagonal output delay provision, i.e. an internal memory stage indicated by a circle segment contiguous with the relevant cell. This provides the equivalent of a one clock cycle diagonal output delay. The boundary, internal and multiplier cells B, I and M, are transputer type IMS T800 manufactured by Inmos Ltd, a British company. They communicate to one another via single-bit links which transmit data in thirty-two bit floating point format of the kind previously mentioned. Each thirty-two bit data value is transmitter serially along the relevant link at a bit rate of 20 MHz governed by a respective clock within each cell (not shown). The transputers incorporate internal memories, and may also read from and write to external memory via thirty-two bit buses. In the present example, the first row transputers, i.e. boundary and internal cells $B_{11}$ to $B_{15}$, have external memory read connections to AND gates A1 to AY1. The multiplexer cell $M_{55}$ has an external memory write connection to an output Q01. The first boundary cell receives a one-bit input from the output of the third status latch SL3, and the multiplier cell $M_{55}$ receives a similar input from the output of the twelfth status latch SL12.

The boundary, internal and multiplier cells have differing references and outlines to indicate differing processing functions. The latter are illustrated in FIG. 2. Each of the boundary, internal and multiplier cells carries out the respective operation set out in FIG. 2 on each data clock cycle under the control of a respective internally stored transputer programme.

The boundary cells $B_{11}$ to $B_{44}$ are programmed such that, on activation by the, data clock Δ, they input a value δ from above left an a value ϕ from above. Each of them stores a respective quantity $\bar{r}$ computed on a preceding cycle and originally zero, and it produces an updated value $\bar{r}'$ of $\bar{r}$ by computing $$\bar{r}'=\bar{r}+\delta\phi^2 \tag{1.1}$$

Having computed its respective $\bar{r}'$ each boundary cell calculates a sine-like rotation parameter $\bar{s}$ from $$\bar{s}=\delta\phi/\bar{r}' \tag{1.2}$$

It then outputs $\bar{s}$ and ϕ, the latter now designated $\bar{\phi}$, and, on the next clock cycle, these pass horizontally to the right to the respective neighbouring internal cell in the same row. The cell also outputs a stored value δ' as δ' diagonally below right, and replaces δ' in store by a new value in accordance with $$\delta'=\delta\bar{r}/\bar{r}' \tag{1.3}$$

Equation (1.3) is equivalent to delaying output of δ' by one additional clock cycle. The cell also replaces its stored value $\bar{r}$ by $\bar{r}'$. If the right hand side of equation (1.2) or (1.3) produces division by zero, the left hand side is set to zero.

The first row boundary cell $B_{11}$ is programmed to receive slightly different input formats as compared to otherwise similar Cells $B_{22}$ to $B_{44}$. It receives a one-bit upper left input δ of 0 or 1 via a serial input line, but reads the value ham LUT1 as through from an external memory in thirty-two bit parallel floating point format It communicates with neighbouring cells $I_{12}$ and $B_{22}$ in a bit serial manner. Boundary calls $B_{22}$ to $B_{44}$ are programmed to receive bit-serial thirty-two bit inputs. All boundary cells $B_{11}$ generate bit-serial outputs, horizontal outputs $\bar{s}$ and $\bar{\phi}$ being provided as sixty-four successive bits comprising two thirty-two bit values each having eight exponent bits and twenty-four mantissa bits as previously mentioned. The output δ" requires only thirty-two bits.

Internal cells in we second to fourth columns of the QR processor 18, i.e. cells $I_{ij}$ where j=2, 3 or 4, have stored elements k and operate on vertical inputs ϕ to produce outputs ϕ'. Fifth column internal cells $I_{i5}$ have identical processing functions, but their stored elements are designated u and their vertical inputs and outputs are designated y and $\bar{y}$. All internal cells receive horizontal input of s and $\bar{\phi}$ from respective left hand neighbour cells, and subsequently pass them on the next data clock cycle to right hand neighbours where available. Fifth column internal cells $I_{i5}$ have unconnected right hand outputs in this example.

The processing fraction of the internal cells are as follows:

$$\phi'=\phi-\bar{\phi}k, \text{ or } y'=y-\bar{\phi}u \quad (2.1)$$

$$k'=k+\bar{s}\phi', \text{ or } u'=u+\bar{s}y' \quad (2.2)$$

$$k=k', \text{ or } u=u' \quad (2.3)$$

In other words, each internal cell computes a vertical output $\phi'$ or $y'$ by subtracting the product of its stored element k or u (originally zero) with a left hand inputs $\bar{\phi}$ from its vertical input $\phi$ or y. It then updates its stored element k or u by substituting the sum of its previous stored element with the product of its vertical output and its second left hand input $\bar{s}$. These operations occur every data clock cycle. First row internal cells $I_{12}$ to $I_{15}$ receive thirty-two bit parallel (external memory read) inputs from above, but all other internal cell inputs and outputs are bit serial as previously described for boundary cells.

The multiplier cell $M_{55}$ receives serial thirty-two bit inputs y and $\phi$ from above and above left respectively, together with a single bit input $\phi$ from above right (output of status latch SL11). When $\phi$=1, the multiplier's vertical output e is $\delta y$, the product of its two inputs. When $\sigma$=0, the output E is the vertical input y. The multiplier $M_{55}$ provides its output in thirty-two bit parallel floating point format (external memory write) at Q01. These operations occur in response to the data clock $\Delta$ every clock cycle. The multiplier cell $M_{55}$ is required only for determining error values when $\sigma$=1. It is not required when $\sigma$=0, and may be omitted in applications of the invention not requiring error calculation.

The transputers employed in the QR and LSM programs 18 and 20 are well-known commercially available devices. Their programming to carry out the processing functions set out above is elementary, and will not be described.

Figure 3:
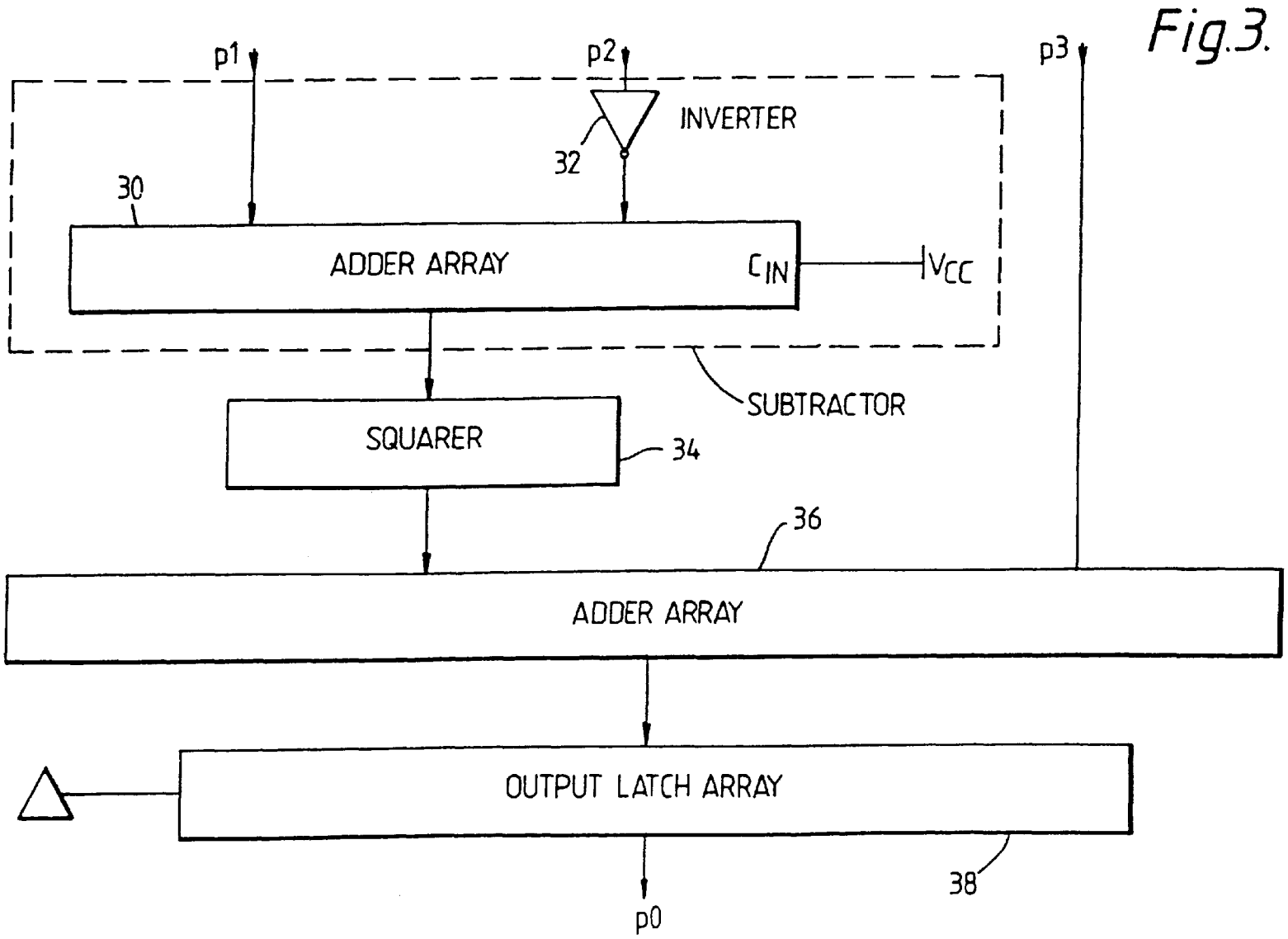
FIG. 3 is a more detailed block diagram of a digital arithmetic unit of the FIG. 1 processor.

Referring now also to FIG. 3, the structure of each of the processing cells P is shown in more detail. The first and second sixteen-bit inputs $P^1$ and $P^2$ are connected to an adder array 30, the connection being made via an inverter array 32 in the can of the second input $P^2$. The adder array 30 has a carry input $C_{in}$ connected to a supply voltage $V_{cc}$ corresponding to logic 1. The combination of inversion of all sixteen bits of the $P^2$ signal at 32 and addition of 1 to its least significant bit by virtue of $C_{in}$=1 has the effect of converting the signal at $P^2$ to its two's complement. The addition of the $P^2$ signal to the two's complement of the $P^2$ signal corresponds to subtraction. The resulting difference is fed to a squarer 34, which produces a squared difference signal for output to a second adder array 36. The second adder array 36 adds the squared difference to the third input signal at $P^3$, and the resulting output sum is stored in a latch array 38 clocked by the data clock $\Delta$.

The inverter array 32 consist of three type number 74LS04 devices. The adder may 30 incorporates four type number 74LS293 four-bit adders. The squarer 34 consists of two type number MSL27512 64K by 8 bit programmed read-only memories (PROMS). They accept a sixteen-bit address input, and each provides an eight bit output. Collectively, they output the sixteen most significant bits of a thirty-two bit number equal to the square of their common input address. In, effect, the lower sixteen bits of the square are ignored to reduce the amount of processing circuitry required. The second adder array 36 consists of five type number 74LS293 adders in parallel. It adds the sixteen bit output of the squarer 34 to a twenty-bit signal from input $P^3$ to provide a twenty-bit output to the latch array 38, Each arithmetic unit P in a column adds a sixteen bit number from the squarer 34 to the sum of similar squared results arising from the preceding members of the column. The purpose of employing twenty-bit input to and output from the second adder array 36 is to provide for the size of the accumulating sum to grow.

The latch array 38 consists of three eight-bit latches type 74LS273, the upper half of one of the latches not being used. This provides twenty latched bits for output at $P^0$. The lowermost arithmetic units in each column, $P_{21}$ to $P_{24}$ have sixteen bit outputs formed by leaving unconnected the four least significant output bits of their respective latch arrays 38. A detailed drawing of an arithmetic unit P will therefore not be given since its design is straightforward.

The overall mode of operation of the processor 10 will now be described. Initially, the centre clock □ is operated in synchronism with application of four successive centre elements to each of the centre inputs CI1 and CI2, one element being input on each centre clock cycle. The first centre input CI1 receives the sequence of centre elements $c_{41}$, $c_{31}$, $c_{21}$ and $c_{11}$, whereas the second centre input receives the sequence of centre elements $c_{42}$, $c_{32}$, $c_{22}$ and $c_{12}$. These are clocked by the centre clock □ into the centre latch chains CL11 to CL14 and CL21 to CL24 respectively on four successive clock cycles. The centre clock then stops. This provides for centre element $C_{ij}$ to be stored on centre latch $CL_{ji}$, i.e. The centre element location corresponds to the inverse of the element's indices. Elements $c_{i1}$ and $c_{i2}$ are the elements of an ith two-dimensional vector $c_{i1}$ locating the ith centre (i=1 to 4). The elements $c_{i1}$ and $c_{i2}$ are stored in adjacent arithmetic units $P_{1i}$ and $P_{2i}$ (i=1 to 4) in the first and second rows of the $\Phi$ processor 16. Consequently, each vertical pair or column of arithmetic units P becomes associated with a respective centre vector having two elements.

To initialise other parts of the processor 10, the data clock $\Delta$ is operated and the signal validity input SVI is held at logic 0 for twelve clock cycles. During this interval, and also for a subsequent internal to be described later, the signal status input SSI A held at logic 1. The SVI logic 0 input causes the one-bit inputs of AND gates A1 to A4 and AY1 to be switched to 0 on successive clock cycles; i.e. The one bit input to A1 is 0 after three clock cycles, that to A2 after four and so on up to that to AY1 after seven clock cycles. In consequence, the outputs from these AND gates switch to 0 in succession, and the first row of processing cells $B_{11}$ to $I_{15}$ of the QR/LSM processor 18/20 receive successive zero inputs. By inspection, it will be seen that any signal path through the QR/LSM processor 18/20 via the jth first row cell to the output Q01 requires (10−j) data clock cycles, boundary cells having a diagonal delay of two clock cycles but a lateral delay of one clock cycle. The jth first row cell is however connected via AND gate $A_j$ to the validity input SVI via (2+j) latches SL1 to SL2+j. In consequence, and irrespective of the signal path through the QR/LSM processor 18/20, after (10−j)+(2+j)=12 clock cycles, the effect of zero inputs to the processor 18/20 have reached the output Q01. From equations (1.1) to (1.3) and (2.1) to (2.3), since stored elements $\bar{r}$, k and u are initially zero, aid vertical inputs to first row cells $B_{11}$ to $I_{15}$ become zero in sequence, stored elements $\bar{r}$, k and u remain zero and cell outputs are set to zero in the QR/LSM processor 18/20. The Q01 output signal is therefore zero after twelve data clock cycles, and the signals at signals validity and status outputs SVO and SSO are 0 and 1 respectively.

Figure 4:
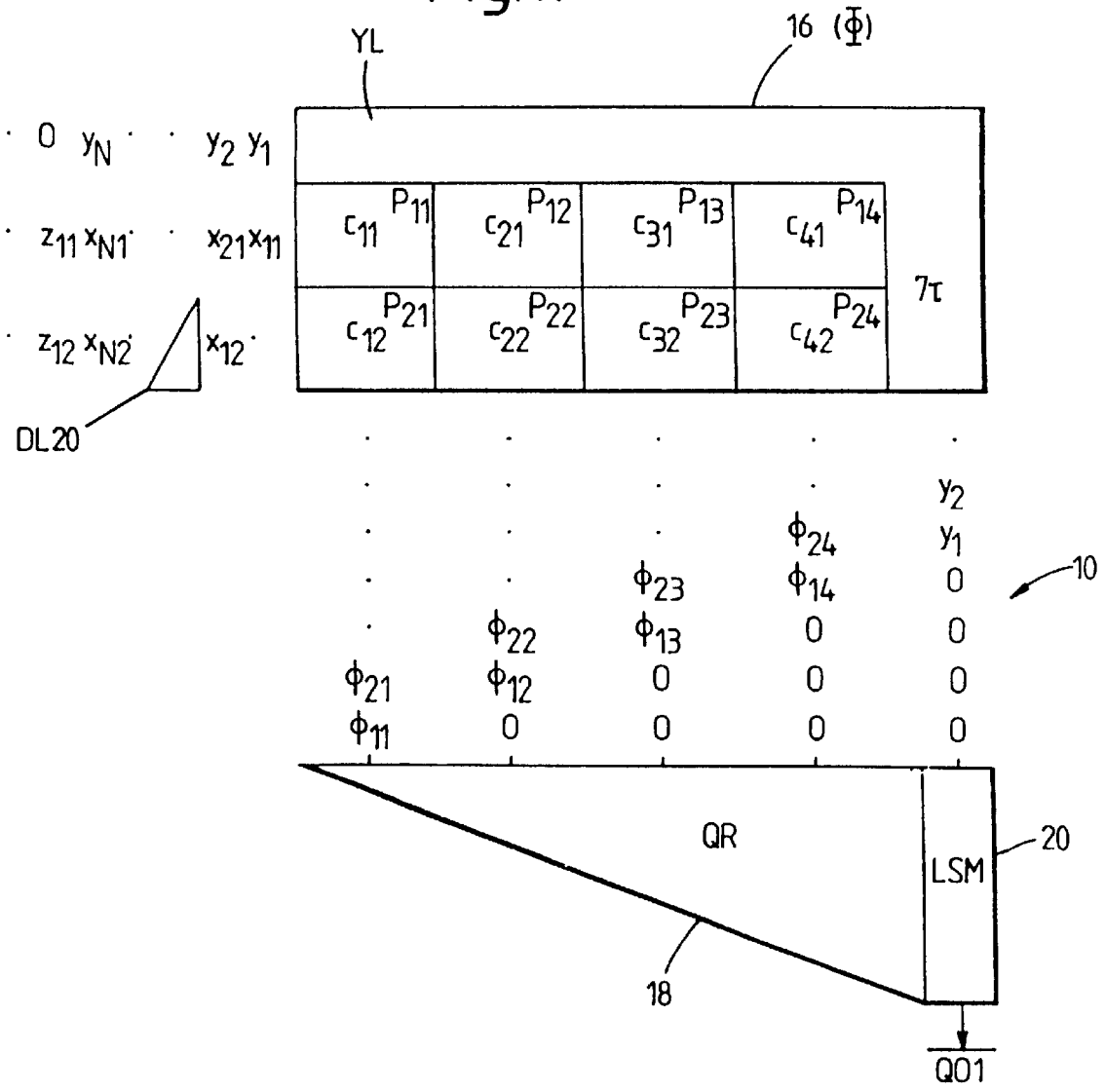
FIG. 4 is a simplified schematic drawing of the FIG. 1 processor illustrating throughput timing.
Figure 6:
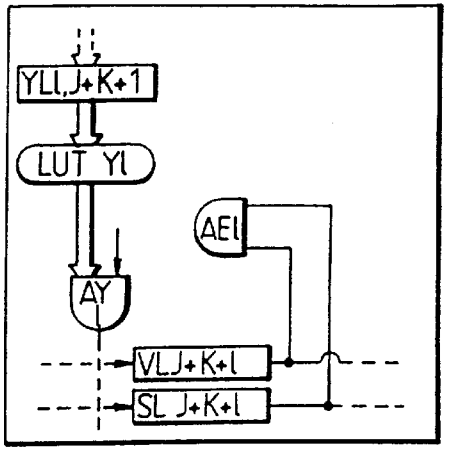
FIGS. 6, 7 and 8 illustrate parts of FIG. 5 in more detail.

The next phase of operation of the processor 10 is referred to as the training phase. The signal at validity input SVI is switched to logic 1, whereas that at status input SSI remains at logic 1. On N successive data clock cycles immediately following the twelve initialisation cycles previously mentioned, N successive training data vectors $\underline{x}_1, \underline{x}_2, \ldots \underline{x}_N$ are input data inputs DI1 and DI2. Each vector $\underline{x}_n$(n=1 to N) has two scalar elements $x_{n1}$ and $x_{n2}$ which are input DI1 and DI2 respectively; i.e. element $x_{ni}$ is input to DIi. This corresponds to serial vector input in an element parallel manner. In synchronism with input of each training data vector $\underline{x}_n$, a respective training answer $y_n$ is input at YI1, each $y_n$ being a scalar quantity in the present example. Referring now also to FIG. 4, a greatly simplified version of the FIG. 1 processor 10 is shown to illustrate timing of operation. On the thirteenth data clock cycle, i.e. The first data clock cycle after initialisation, the first training answer $y_1$ is clocked into the Y latch chain to undergo seven data clock cycles (7τ) of delay before emerging from the Φ processor 16. At the same time, the first element $x_{11}$ of the first training data vector $\underline{x}_1$ is clocked into data latch DL11 and presented to the first row, first column arithmetic unit input $P_{11}^1$. Here it undergoes subtraction of the first element $c_{11}$ *of the first centre vector* $\underline{c}_1$. The result of subtraction is squared within unit $P_{11}$, and the square is added to the signal at the third input $P_{11}^3$ (zero in this case). On the next data clock cycle, the second element $x_{12}$ of the first training data vector is input to unit $P_{21}$, having being delayed relative to $x_{11}$ input by data latch DL20. On this clock cycle, the result of the subtract-square-add operation in unit $P_{11}$ is clocked out of $P_{11}^0$ and appears at the input $P_{21}^3$. Consequently the second row, first column arithmetic unit $P_{21}$ subtracts $c_{12}$ from $X_{12}$, squares the result and adds it to the similar result involving $x_{11}$ and $c_{11}$ output from $P_{11}$. On the subsequent (fifteenth) data clock cycle, the output clocked from arithmetic unit $P_{21}$ is therefore $(x_{11}-c_{11})^2+(x_{12}-c_{12})^2$. This is equal to the square of the distance $D_{11}$ in a Euclidean two-dimensional space between points represented by vectors $\underline{x}_1$ and $\underline{c}_1$; i.e. $D_{11}$ is given by $$D_{11}^2=[x_{11}-c_{11}]^2+[x_{12}-c_{12}]^2=\|\underline{x}_1-\underline{c}_1\|^2 \quad (3)$$

where ‖ . . . ‖ represents the Euclidean norm. (The invention is, however, not restricted to use of the Euclidean norm, provided that the quantity employed is equivalent to a distance.)

The value $D_{11}^2$ is applied to the input of LUT1, which responds by outputting the corresponding negative exponent exp $(-D_{11}^2/10)$. The exponent is referred to as an element $\phi_{11}$; it is given by:

$$\phi_{11}=\exp[-D_{11}^2/10]=\exp[-\|\underline{x}_1-\underline{c}_1\|^2/10] \quad (4)$$

On the fourteenth to sixteenth data clock cycles, computations similar to those described above involving $\underline{x}_1/\underline{c}_2$ take place in second column arithmetic units $P_{12}$ and $P_{22}$. Moreover, a computation involving $\underline{x}_2$ and $\underline{c}_1$ takes place in first column units $P_{11}$ and $P_{21}$. These produce $\phi_{12}$ and $\phi_{21}$ from LUT1 and LUT2 respectively, where $$\phi_{12}=\exp[-D_{12}^2/10]=\exp[-\|\underline{x}_1-\underline{c}_2\|^2/10] \quad (5)$$

and $$\phi_{21}=\exp[-D_{21}^2/10]=\exp[-\|\underline{x}_2-\underline{c}_1\|^2/10] \quad (6)$$

This procedure continues as successive training data vectors $\underline{x}_n$ pass horizontally across the Φ processor 16 each giving rise to four respective values $\phi_{n1}$ to $\phi_{n4}$ output from LUT1 to LUT4 respectively on four successive data clock cycles. In general, the element $\phi_{nm}$ is output from the mth column (LUTm) of the Φ processor 16 on the (n+m 13)th data clock cycle. Of these, the first twelve data clock cycles formed the initialisation interval. Consequently, AND gate A1 receives $\phi_{11}$ on the fifteenth data clock cycle in synchronism with input of logic 1 from the third validity latch VL3. This transfers $\phi_{11}$ to the vertical input of boundary cell $B_{11}$. Similarly, as the logic 1 signal passes along the validity latch chain, $\phi_{12}$ to $\phi_{14}$ reach internal cells $I_{12}$ to $I_{14}$ via AND gates A2 to A4 on data clock cycles sixteen to eighteen. The logic 1 signal reaches AND gates AE1 and AY1 on the nineteenth data clock cycle, by which time the first training answer $y_1$ has reached AND gate AY1 after a day of delay of seven clock cycles in latches YL11 etc. This results in input of $y_1$ to the first internal cell $I_{15}$ of the LSM processor 20.

To summarise, data clock cycles fifteen to nineteen correspond to input of $\phi_{11}$ to $\phi_{14}$ and $y_1$ to the QR/LSM processor 18/20. In general $\phi_{n1}$ to $\phi_{n4}$ and $y_n$ are input to the processor 18/20 on data clock cycles (n+14) to (n+18). This provides for what is referred to in the art of systolic array processors as a temporally skewed input to the processor 18/20; i.e. input of $\phi_{ni}$ leads input of $\phi_{n,i+1}$ by one clock cycle, and input of $\phi_{n4}$ has a like lead over input $y_n$. This input timing is illustrated in FIG. 4. Each set of four elements $\phi_{n1}$ to $\phi_{n4}$ (n=1,2, . . . N) is treated as a transformed vector $\underline{\phi}_n$, and arises from the nth training data vector $\underline{x}_n$. The QR/LSM processor 18/20 consequently receives input of successive transformed vectors $\underline{\phi}_n$ and associated training answers $y_n$ with a temporal skew of one data clock cycle per element or per first row cell $B_{11}$ to $I_{15}$. Each training answer $y_n$ appears as an extension or extra element or dimension of its corresponding $\underline{\phi}_n$.

The QR/LSM processor 18/20 is of known kind. One mode of operation is described in British Patent No. GB 2,151,378B and U.S. Pat. No. 4,727,503. This first mode corresponds to the present training mode where δ=1 for the first boundary cell $B_{11}$ and σ=1 for the multiplier cell $M_{55}$. Its operation in a second mode to be described later (δ=σ=0) is disclosed by J. G. McWhirter and T. J. Shepard in "A Systolic Array for Linearly Constrained Least-Squares Problems", Proc. SPIE, Vol. 696, Advanced Algorithms and Architectures for Signal Processing (1986). Its operation will therefore be given in brief only. The processing functions for the boundary and internal cells $B_{11}$ to $B_{44}$ and $I_{12}$ to $I_{45}$ set out in FIG. 2 are in accordance with a Givens'square-root free rotation algorithm. They provide for the QR processor 18 to execute a QR decomposition of successive temporally skewed input vectors $\underline{\phi}_n$ (n=1 to N). The decomposition results in the input matrix $\underline{\Phi}$(N) (consisting of row $\underline{\phi}_1$ to $\underline{\phi}_N$) being triangularised by rotation, and providing parameters of the form $\bar{s}$ and $\bar{\phi}$ which operate on $y_1$ to $y_N$ as though the latter constituted an extra column of $\underline{\Phi}$(N); $\bar{s}$ is related to the sine of the angle through which $\underline{\Phi}$ is rotated. Rotation algorithms for triangularising matrices are well known, and may involve the computation of square-roots or be of the square-root free variety. They are described in the foregoing prior art, and also by W. Givens in J. Soc. Ind. Appl. Math. 6, 26–50 (1958) and W. M. Gentleman in J. Inst. Maths. Applics. 12, pp 329–336 (1973). In the computationally more onerous rotation algorithms involving square-roots, the traingular matrix R (into which the matrix $\underline{\Phi}$ is rotated) has matrix elements r stored on individual boundary and internal cells and updated each clock cycle. It computes explicit sine and cosine rotation parameters. In the more convenient square-root free variety, R is not computed explicitly. It is treated as a product of a diagonal matrix and a triangular matrix, the squares of the elements of the diagonal matrix being stored on boundary cells and the elements of the triangular matrix being stored on internal cells and updated each clock cycle in both cases. Even though R is not computed explicitly, this form of processing is also referred to as QR decomposition. In the present example, square-root free processing functions are employed as set out in FIG. 2. However, rotation algorithms are equivalent, and choice of an individual algorithm does not affect the computation other than possibly as regards degree of accuracy.

GB 2,151,378B and U.S. Pat. No. 4,727,503 referred to above prove in detail that input of successive temporally skewed vectors $\underline{\phi}_1 \ldots \underline{\phi}_n \ldots \underline{\phi}_N$ and scalars $y_1 \ldots y_n \ldots y_N$ to a QR/LSM array of the kind 18/20 produces from the multiplier cell $Mp_{55}$ least squares residuals $e_1 \ldots e_n \ldots e_N$, the general value $e_n$ being given by $$e_n = \underline{\phi}_n^T \underline{w}(n) + y_n \tag{7}$$

where the symbol T indicates the transpose of a column vector $\underline{\phi}_n$ to a row vector $\underline{\phi}_n^T$; $\underline{w}(n)$ is at least squares weight vector arising from inputs $\underline{\phi}_1$ to $\underline{\phi}_n$. The residuals $e_n$are produced by the multiplier cell $M_{55}$ by multiplying its two inputs δ and y together, since in the training mode σ input from the eleventh status latch SL11 is equal to 1.

The vector $\underline{w}(n)$ is not in fact computed explicitly. The QR/LSM processor 18/20 produces $e_n$ by a route which avoids this.

Each value $e_n$ is a least squares residual arising from a suitable weight vector $\underline{w}(n)$ operating on $\underline{\phi}_n$, and computed such that the expression $$\sum_{i=1}^{n} \left[\underline{\phi}_i^T \underline{w}(n) + y_i\right]^2$$

has a minimum value. In effect, the implicit weight vector $\underline{w}(n)$ is arranged to vary until the weighted linear combination $\underline{\phi}_i^T \underline{w}(n)$ is as nearly possible of equal magnitude and opposite sign to $y_i$, averaged from i=1 to n. The residual $e_n$then expresses the remaining error or degree of mismatch still existing after this process has been carried out on at least squares basis.

The training mode of operation is carried out until the Nth training data vector $\underline{x}_N$ and training answer $y_N$ have passed ito the Φ processor 16. Twelve data clock cycles after input of $\underline{x}_N$ and $y_N$ at DI1/DI2 and YI1, the corresponding residual $e_n$ is output at Q01 from the multiplier cell $M_{55}$ and given by $$e_N = \underline{\phi}_N^T \underline{w}(N) + y_N \tag{8}$$

The weight vector $\underline{w}(N)$ is that arising from all $\underline{\phi}_1$ to $\underline{\phi}_N$, which respectively correspond to $\underline{x}_1$ to $\underline{x}_N$. Although as has been said $\underline{w}(N)$ is not computed explicitly, the operation of the QR/LSM processor 18/20 provides residuals $e_1$ to $e_N$ as if it had been computed; i.e. the boundary and internal cells $B_{11}$ to $B_{44}$ and $I_{12}$ to $I_{45}$ compute stored matrix elements and generate and apply rotation parameters respectively (as set out in FIG. 2) to implement transformations providing residuals equivalent to those which would arise from an explicit computation of $\underline{w}(n)$ in each case n=1 to N.

After input of $\phi_{N1}$ (corresponding to $\underline{x}_N$ and $\underline{c}_1$) to the first boundary cell $B_{11}$, this cell's stored element $\bar{r}$ has been computed over all first column elements $\phi_{11}$ to $\phi_{N1}$ to the matrix $\underline{\Phi}$. This occurs on the (N+15)th data clock cycle. One clock cycle later, the stored element k of internal cell $I_{12}$ becomes updated. One further clock cycle later, the elements of cells $B_{22}$ and $I_{13}$ become updated. Consequently, what may be termed a wave-front passes through the QR/LSM processor 18/20 producing final update of the stored elements $\bar{r}$ and k or u in the respective cells. This will not be described in detail, since temporally skewed systolic array operation and timing is well known.

On the data clock cycle following input of $\underline{x}_N$ and $y_N$ to inputs DI1/DI2 and YI1, the inputs to the Φ processor 16 are switched to the test mode of operation. In this mode, test data values are substituted for training data values, and provision is made to suppress update of elements stored in the QR/LSM processor 18/20 in a temporally skewed manner. The test data values are $\underline{z}_m$ (m=1 to M); these have elements $z_{m1}$ and $z_{m2}$ which replace elements $x_{n1}$ and $x_{n2}$ data inputs DI1 and DI2 respectively. Training answer input YI1 receives zero inputs throughout the test mode. Test data vectors $\underline{z}_m$ become transformed in the Φ processor 16 to vectors $\underline{\phi}(z)$; each transformed data vector becomes extended by a zero element because YI1=0, corresponding to absence of a training answer. The signal validity input SVI remains at logic 1, but the signal status input SSI is switched to logic 0. This also forces zeros into AND gate AY1 seven clock cycles later, so it is in fact unnecessary to set YI1 to zero.

On the data clock cycle after boundary cell $B_{11}$ received $\phi_{N1}$, it receives $\phi_{11}(z)$, i.e. the element arising from processing of $\underline{z}_1$ in the first column of the Φ processor 16. This clock cycle is three cycles later than the switching of status input SSI from 1 to 0. Consequently, the first boundary cell $B_{11}$ receives δ=0 from the third status latch SL3. This has the effect of suppressing update of the cell's stored element $\bar{r}$, since $\bar{r}'$ is computed from $\bar{r}+\delta\phi^2$, and provides for $\bar{s}=\delta\phi/\bar{r}'$ to be equal to zero. Once clock cycle later, when s=0 reaches internal cell $I_{12}$ in synchronism with input of $\phi(z)$, update of k stored within that cell is suppressed since $k'=k+\bar{s}\phi'$. Stored element update suppression passes as a wave-front along the rows and down the boundary diagonal of the QR/LSM processor 18/20. Each cell experiences update suppression in synchronism with input of elements $\phi_{11}(z)$ to $\phi_{14}(z)$ (cells $B_{11}$ to $I_{14}$), 0 (cell $I_{15}$), or inputs derived therefrom in the case of cells below the first row.

In consequence of update suppression, each vector $\underline{\phi}_m(z)$ (m=1 to M) produced from a respective $\underline{z}_m$ becomes processed at boundary and internal cells operating non-adaptively. The cells implement a transformation equivalent to weighting with the final version $\underline{w}(N)$ of the weight vector. On the data clock cycle following computation of the last residual $e_N$ by the multiplier $M_{55}$, the input σ from the eleventh status latch SL11 becomes logic 0. The multiplier $M_{55}$ consequently outputs its vertical input without multiplication by δ. Under these circumstances, with each $\underline{\phi}(z)$ vector extended by a zero element, it is shown in the patents previously referred to that the output $E_1$ of the multiplier cell $M_{55}$ is given by $$E_1 = \underline{\phi}_1^T(z)\underline{w}(N) \tag{9}$$

On subsequent data clock cycles $E_2$, $E_3 \ldots E_M$ are output by the multiplier $M_{55}$ in sequence, the general expression being $$E_m = \underline{\phi}_m^T(z)\underline{w}(N) \tag{10}$$

Equation (10) may be rewritten as $$E_m = \sum_{i=1}^{4} \phi_{mi}(z)w_i(N) \tag{11}$$

Equations (10) and (11) show that $E_m$ is derived by transforming $z_m$ to $\underline{\phi}_m(z)$ as a nonlinear function (Gaussian) extending from four origins or centres $\underline{c}_1$ to $\underline{c}_4$, and then forming a linear combination of sum of $\phi(z)$ elements weighted with the elements $w_1(N)$ to $w_4(N)$ of a weight vector $\underline{w}(N)$ obtained from a (least squares) fit of like-transformed data $\underline{x}_n$ to known answers $y_n$.

The processor 10 consequently produces estimates $E_m$ of unknown results on the basis of a model obtained by fitting tranformed training data to training answers. Strictly speaking, the estimates $E_m$ are produced with opposite sign to $y_n$, as shown by comparison by Equations (8) and (10).

Since the processor 10 incorporates a nonlinear transformation, it is suitable for nonlinear problems. Furthermore, the processor 10 is guaranteed to produce convergence to a unique set of solutions or estimates $E_m$ that is the best obtainable on the basis of any particular choice of nonlinear function, positioning of centres $\underline{c}_1$ to $\underline{c}_4$ and number and accuracy of training data and answer sets. Convergence of the model occurs in a fixed time, i.e. the latency of the processor 10 (twelve data clock cycles) plus the number of training data/answer sets.

Referring now to Table 1, there are shown the validity and status output signals and the output signal at Q01 to which they correspond. the Q01 output is meaningless if SVO is at logic 0. If SVO is at logic 1, Q01 provides errors $e_n$ or estimates (results) $E_m$ according to whether SVO is at logic 1 or 0.

TABLE 1

| Q01 | SVO (validity) | SSO (status) |
|---|---|---|
| meaningless | 0 | 0 or 1 |
| error $e_n$ | 1 | 1 |
| estimate $E_m$ | 1 | 0 |

In practice the processor 10 is operated in the training mode until an error value $e_n$ is obtained which is sufficiently small to indicate an accurate fit of transformed training data to training answers has been obtained. If $e_n$ does not become sufficiently small as n increases, it means that the training data and/or answers are inaccurate, the centres $\underline{c}_1$ to $\underline{c}_4$ are too few or poorly chosen, or the nonlinear function (Gaussian in the preceding example) is appropriate. When $e_n$ becomes sufficiently small, the processor 10 may be used provide estimates $E_m$ from test data. It should not however be assumed from this that the error values $e_n$ monotonically fall to some low level irrespective of input data. In fact, error values are obtained by the processor 10 in the course of fitting or weighting the elements of successive $\underline{\phi}$ vectors. This requires four weighting coefficients or elements as indicated in Equation 11. No least squares fit can arise until a problem is overdetermined by having more data values than determinable coefficients. In consequence, no error value arises until after a start-up period ends, i.e. until after five transformed vectors $\underline{\phi}_1$, $\underline{\phi}_2$ etc have been input to the QR/LSM processor 18/20 and have given rise to an output at Q01 eight clock cycles later. The error value $e_n$ is therefore zero for the first four transformed vectors $\underline{\phi}_1$ to $\underline{\phi}_4$, and becomes non-zero for $\underline{\phi}_5$ and subsequent terms. Mathematically, it is an "a posteriori residual". It indicates the least squares error obtained between the most recent data vector and a model computed over all data vectors including the most recent. "Most recent" in this sense means the latest data vector which has given rise to an output at Q01. In other words, the a posteriori residual $e_n$ is the error between $\underline{\phi}_n$ and the model computed from $\underline{\phi}_1$ to $\underline{\phi}_n$.

In the course of the training mode, the QR/LSM processor 18/20 builds up a model in terms of $\underline{R}$ matrix elements stored on individual cells. If during training but after start-up the error values $e_n$ becomes appreciably larger in response to inupt data vectors, it means that the model is changing significantly to accommodate new information. This might arise if the training procedure introduced data relating to a previously unexamined region. If so, more data on such a region should be used in training to allow the model to adapt to accommodate it.

The processor 10 may be employed to output another form of residual or error value, the "a priori residual". A feature of the processing functions illustrated in FIG. 2 is that the output of the lowermost internal cell $I_{45}$ is the a priori residual, this being a consequence of the square root free rotation algorithm employed. It can be shown that this residual is the error obtained between $\phi_n$ and a model computed from $\underline{\phi}_1$ to $\underline{\phi}_{n-1}$; i.e., the model is computed over all but the most recent value before the error between that value and the model is determined.

The processor 10 has been described as operating on two-dimensional data, employing four two-dimensional centres and producing one-dimensional estimates $E_m$ in the basis of one-dimensional training answers. It may be referred to as a 2/4/1 device. It is exemplified in this form because it is then suitable for modelling the EX-OR problem, for which the linear perceptron approach is inappropriate. It is however by no means restricted to a 2/4/1 structure, as will now be described.

Referring now to FIGS. 5 to 8, in which elements equivalent to those previously described are like or similarly referenced, there is shown a simplified representation of a processor 10 of the invention in J/K/L form; i.e. the input space (data vectors $\underline{x}$ or $\underline{z}$) is J-dimensional, there are K centres and the answer or output space (vectors $\underline{y}$ or $\underline{E}$) is L-dimensional. Chain lines and dots appear in FIG. 5 to indicate structure not illustrated explicitly.

The J/K/L processor 10 has J data inputs DI1 to DIJ, the jth data iput DIj (j=1 to J) being connected to the Φ processor 16 via (j−1) data latches indicated collectively by a triangle 50. The latch array 50 provides a temporal input skew across the elements $x_{n1}$ to $x_{nJ}$ of input data vectors such as $x_n$. The array 50 is the higher dimensional equivalent of the single latch DL20.

There are L inputs YI1 to YIL for elements $y_{n1}$ to $y_{nL}$ of training answer vectors $y_n$, and the 1th input YI1 (1=1 to L) is connected to the Φ processor 16 via (1−1) latches collectively forming a triangle 52. Signals from each of the inputs YI1 to YIL undergo delays of (J+K+1)τ within the Φ processor 16, where τ is a data clock cycle.

Status and validity inputs SSI and SVI are connected via J latches to the Φ processor 16, as opposed to two in the earlier example.

The processor 16 has a J by K array of arithmetic units $P_{11}$ to $P_{JK}$ each of the kind previously described. Each column of arithmetic units has a respective AND gate, so there are K AND gates A1 to AK each with neighbouring status and validity latches (not shown). Similarly, signals from inputs YI1 to YIL pass to respective AND gates AY1 to AYL with associated enabling AND gates AE1 to AEL (not shown). The general Y signal AND gate AY1 (1=1 to L) is illustrated inset in FIG. 6. Its enabling gate AE1 receives input signals from the (J+K+1)th status and validity latches as shown.

Figure 8:
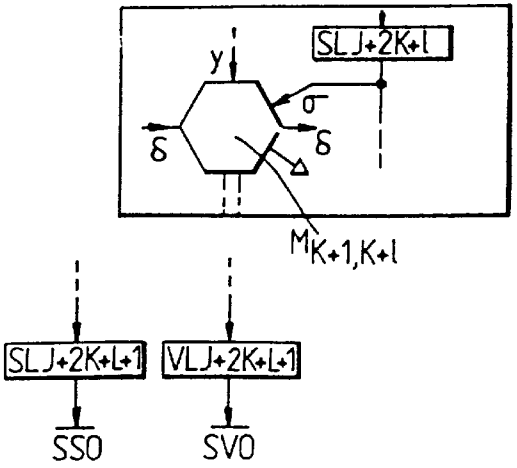
Figure 5:
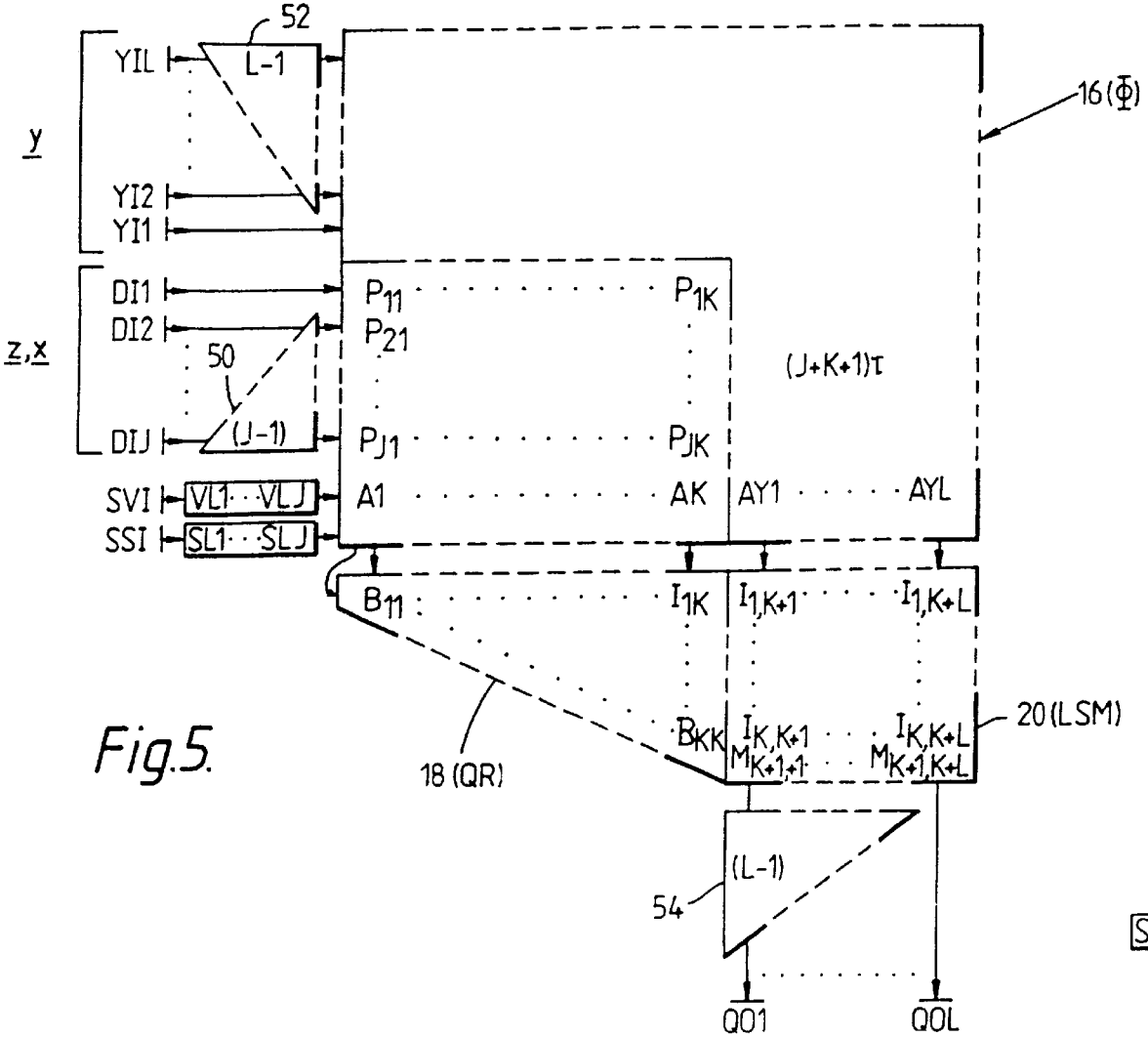
FIG. 5 is a schematic drawing of an extended version of a heuristic processor of the invention.
Figure 7:
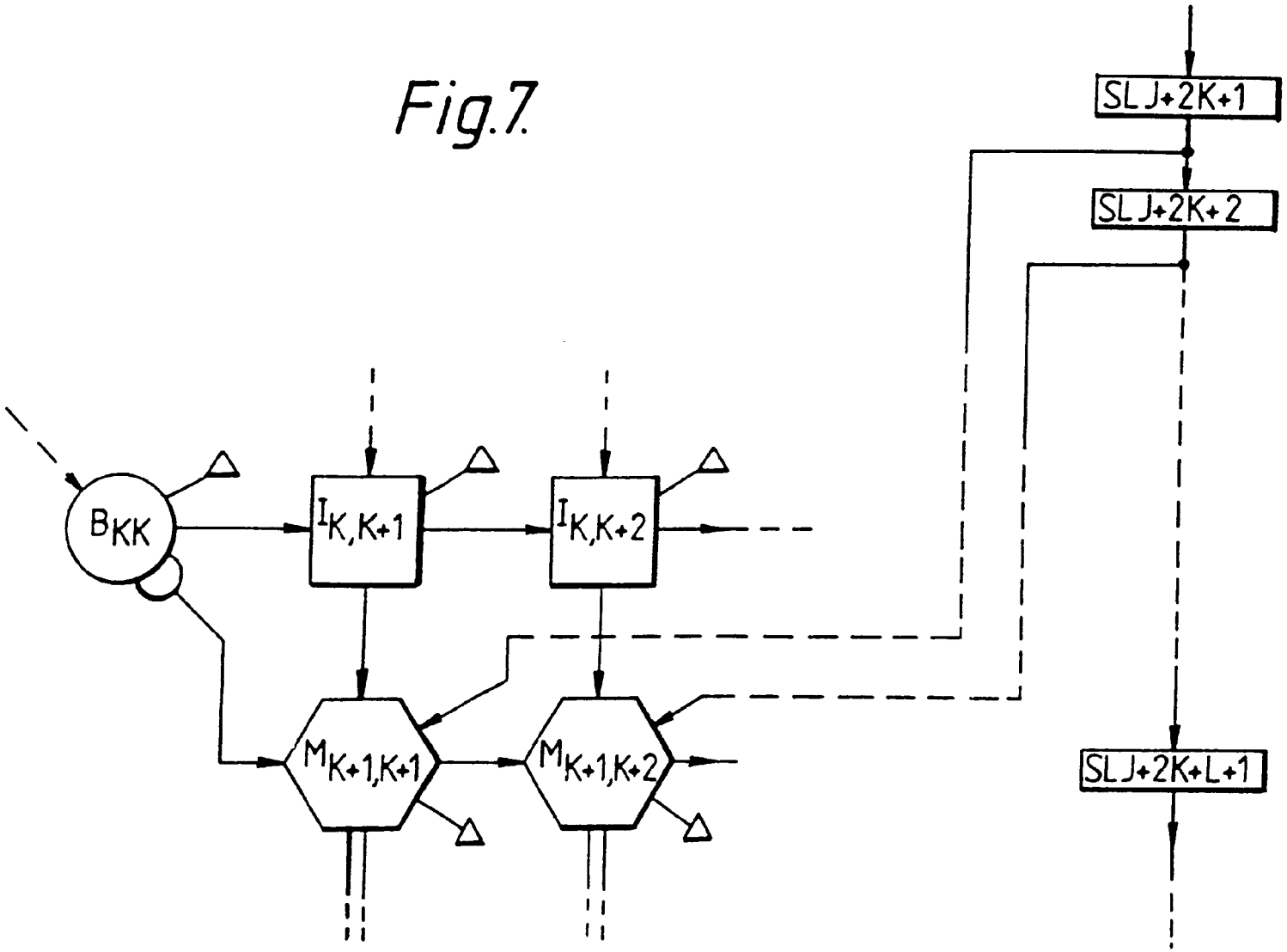

The QR and LSM processors are expanded to K by K and K by L arrays respectively. The first boundary cell $B_{11}$ receives a δ input from the (J+1)th status latch SLJ+1 (now shown) within the processor 16. The single LSM column in the FIG. 1 example now becomes an array of like columns. Data flow is along rows and columns of the combined QR/LSM processor as previously described. FIG. 7 is an illustration of part of FIG. 5 shown in more detail. It shows the first two multiplier cells $M_{K+1,K+1}$, $M_{K+1,K+2}$, together with internal cells $I_{K,K+1}$, $I_{K,K+2}$ above them and lowermost boundary cell $B_{KK}$ to their left. All cell processing functions are as previously described with reference to FIG. 2; i.e. rotation parameters, s, ϕ, are passed along the rows of the extended LSM processor 20. Input values y are employed to compute y' for output down respective columns, and, during training mode, are used to update u. Each multiplier cell passes on input values δ to a respective neighbouring multiplier cell (where applicable). During training mode, it multiplies its vertical input by δ to produce an output below. During test mode, the vertical input provides an output directly. Each of the cells type B, I, M operates under the control of the data clock Δ as before. The additional LSM columns operate progressively later in time. To accommodate this, the 1th multiplier cell $M_{K+1,K+l}$ receives a σ input from the (J+2K+1)th status latch (1=1 to L) as illustrated in FIG. 8. Consequently, the multiplier cells switch from output of error elements to estimate elements in succession along their now. To provide for simultaneous output from the LSM processor 20, a third array of latches 54 is employed to implement temporal deskewing. The latch array 54 provides for the 1th multiplier cell $M_{K+1,K+l}$ to be connected to its respective output Q01 by (L−1) latches. Status and validity outputs SSO and SVO are connected to corresponding inputs SSI and SVI by respective chains of (J+2K+L+1) latches, of which the last is shown in each case.

The latch arrays 50, 52 and 54 provide for simultaneous input of elements of each vector (x,y or z) to the Φ processor 16, and for simultaneous output of errors and estimates which are now vectors e and E.

The FIG. 5 processor 10 demonstrates applicability of the invention to complex problems. In many cases, the number of parameters required to model a system, i.e. the number of elements per input vector x or z, may be unknown. Moreover, the number of expansion centres $c_1$ etc necessary may be unknown. Under these circumstances, increasing numbers of centre and input parameters may be employed to achieve acceptably small error values during training. In other words, training is carried out with a selected number of centres and parameters. If this yields poor error values, the number of centres and/or the number of parameters is increased. The processor may also be tested by inserting test data z for which there are known answers but which are not employed in training. The estimate vectors E may then be compared with the known answers to which they should correspond.

The equivalent of equations (10) and (11) for the J/K/L processor of FIG. 5 are as follows:

$$\underline{E}_m = \underline{\phi}_m^T(z)\underline{W}(N) \tag{12}$$

$$E_{mn} = \sum_{l=1}^{L} \phi_{ml}(z)W_{ln}(N) \tag{13}$$

Equations (12) and (13) demonstrate that the weight vector $\underline{w}(N)$ of equations (10) and (11) has become a weight matrix $\underline{W}(N)$ having column equivalent to individual weight vectors and matrix elements $W_{ln}(N)$.

As has been said, the QR/LSM processor 18/20 does not compute the weight vector or matrix explicitly. It is however possible to extract either of these. By inspection of equations (11) and (13), if a $\underline{\phi}^T$ vector having one unit element and all other elements equal to zero is input to the processor 18/20 when update is suppressed, its output will provide a weight element (equation (11)) or a set of weight elements (equation (13)). Referring to equation (11), successive input vectors $\underline{\phi}^T$ of (1,0,0,0), (0,0,1,0) and (0,0,0,1) are input to the processor 18/20. (Means for achieving this are elementary and will not be described.) This provides elements $w_1(N)$ to $w_4(N)$ of the weight vector $\underline{w}(N)$ on successive clock cycles. Similarly, from equation (13), the FIG. 5 device (receiving like inputs) produces successive rows $W_{11}(N)$ to $W_{1L}(N)$, $W_{21}(N)$ to $W_{2L}(N)$, etc of the weight matrix $\underline{W}(N)$ on successive cycles, $\underline{W}(N)$ having K rows and L columns. Consequently, the form of the weight may be extracted explicitly.

Figure 9:
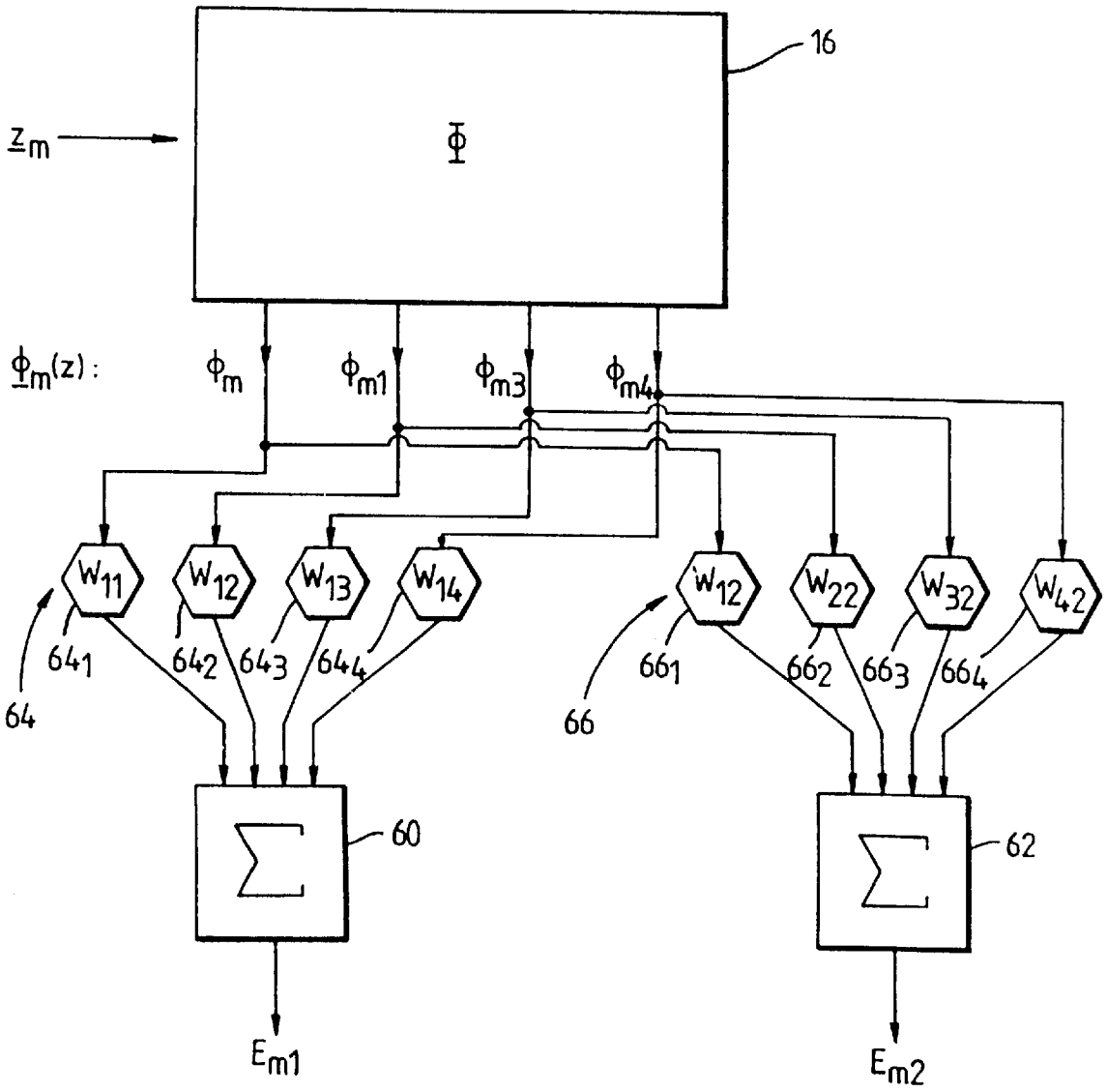
FIG. 9 illustrates a processor for use with weighting data obtained in a FIG. 5 device.

Explicit extraction of the weight leads to a further embodiment of the invention illustrated in FIG. 9. This shows a Φ processor 16 providing $\underline{\phi}_m(z)$ vector elements $\phi_{m1}$ to $\phi_{m4}$ to two adders 60 and 62 via respective weighting multiplier arrays 64 and 66 having multiplier cells $\mathbf{64}_1$ to $\mathbf{64}_4$ and $\mathbf{66}_1$ to $\mathbf{66}_4$. The multiplier cells are arranged to multiply their respective inputs by respective weighting coefficients. Each multiplier array implements multiplication of the row vector $\underline{\phi}_m^T(z)$ by a respective column $W_{1n}$ to $W_{4n}$ (n=1 or 2) of the weight matrix $\underline{W}(N)$ having two rows and four columns. The matrix is determined by the extraction procedure previously described. The adders 60 and 62 consequently provide sums of $\underline{\phi}_m(z)$ vector elements weighted in accordance with the least squares fit determined in a training procedure. These are therefore the elements $E_{m1}$ and $E_{m2}$ of a result estimate vector. This may clearly be extended to generation of result estimate vectors with any number of elements. In consequence, provided that a weight vector or matrix has been determined in a training/extraction procedure, the result may be employed elsewhere on a simplified device as shown in FIG. 9. This is beneficial for problems requiring very large training procedures, but which do not require updating or training. For such problems, a processor 10 may be employed to determine the weighting scheme, and the results may then be loaded into any number of devices of the kind shown in FIG. 9 for use in text mode.

The processor 10 has been described as employing fixed point arithmetic in the Φ processor 16 and floating point arithmetic in the QR/LSM processor 18/20. Fixed point arithmetic devices have the advantage of cheapness and operating speed. Their disadvantage is that of variable percentage accuracy, in that accuracy reduces as number value falls; i.e. the sixteen bit number 1 . . . 1 (all 1s) with an uncertain least significant bit (lsb) id ±0.0008% accurate. However, the number 0 . . . 01 (fifteen 0s, one 1) would be ±50% accurate if the lsb is uncertain. However, the nonlinear function $\exp(-D^2/10)$ employed in look-up tables LUT1 etc is very slowly varying when D is small. Consequently, increasing inaccuracy with reduction in D is counteracted by increasing insensitivity of the exponent to change in D. It is however advisable to employ floating point arithmetic devices in the QR/LSM processor 18/20, since here fixed point inaccuracy may become serious.

The foregoing description has shown how the processor of the invention is trained to produce a nonlinear transformation of a training data set $\underline{x}_n$ with respect to a set of centres or spatial origins $\underline{c}_m$, and subsequently by QR decompositions it carries out operations mathematically equivalent to forming linear combinations (weighting) of the elements $\phi_{ij}$ of each vector $\underline{\phi}_i$ so that the resulting weighted sum given by:

$$\sum_j \phi_{ij} w_j(i)$$

is as nearly as possible equal to $-y_i$ on a least squares error minimisation basis. When in test mode the QR/LSM processor update is suppressed, ie when the processor state is frozen, it can be tested with data for which there are known comparison answers not employed in training. It is then used with test data for which there are no known answers. However, it is not always necessary to perform initialisation and training of the processor 10. For example, it is possible to carry out a large training procedure on one processor 10, establish the validity of its operation, and then subsequently load the QR/LSM section of other processors 10 with the stored elements $\bar{r}$, k and u obtained elsewhere. This provides for a plurality of single (frozen) mode processors to operate in test mode on the basis of the training of a different device. It is advantageous for situations requiring long training data sets but caparatively short test data sets.

In other circumstances, it is an advantage to employ a processor of the invention which is switchable between training and test modes because it allows retraining; ie it is possible to revert back to a training mode after a test sequence and input further training data. The effect of the original training procedure may be removed by initialising the processor with zero inputs as previously described. Its effect may alternatively be retained and merely augmented by input by further training data. This has a potential disadvantage in that each successive training data vector may have progressively less effect. For example, after say one thousand training data vectors have been input, the boundary cell stored element $\bar{r}$ may be very little changed by updating with addition of the one thousand and first $\delta_\phi^2$ (see FIG. 2). To make the QR/LSM processor 18/20 preferentially sensitive to more recent data, what is referred to as a "forget factor" β is introduced. The factor β is known in the field of QR decomposition processing. To implement this, the boundary cell functions given in equations (1.1) and (1.3) are ammended as follows:

$$\bar{r}'=\beta^2 r+\delta_\phi^2$$

$$\delta'=\beta^2\delta r/r'$$

where, during the test phase, $\beta=1$, and during the training phase, $0<\beta<1$. Normally, β will be very close to unity during training. Its effect is to make stored values $\bar{r}$, k and u reduce slightly each clock cycle; ie they decay with time. Elements k and u are affected indirectly via the relationship between $\bar{r}'$ and $\bar{s}$, and $\bar{s}$ and k'.

The foregoing examples of the invention employed a nonlinear transformation of the Euclidean distance D (a real quantity≧0) to $\exp(-D^2/10)$. This function is referred to as the Gaussian approximation in numerical analysis. Possible nonlinear transformations include:

$\phi(D)=D$, piece-wise linear approximation (mathematically a nonlinear transformation involving a fit of line segments to a curve), $\phi(D)=D^3$, cubic approximation, $\phi(D)=D^2\log D$, thin plate splines, $\phi(D)=(D^2+A^2)^{1/2}$, multiquadratic approximation (where A is a positive constant of the order of the mean nearest neighbour distance between the chosen centres)

$\phi(D)=(D^2+A^2)^{-1/2}$, inverse multiquadratic approximation, $\phi(D)=\exp(=D^2/A^2)$, Gaussian approximation referred to above with $A=\sqrt{0}$.

More generally, it is sufficient (but not necessary) for the chosen nonlinear transformation to involve a function which is continuous, monotonic and non-singular. However, functions such as fractal functions not possessing all these properties may also be suitable. Suitability of a function of transformation is testable as previously described by the use of test data with which known answers not employed in training are compared.

The QR/LSM processor 18/20 fits transformed vectors $\underline{\phi}_1$ etc to corresponding training answers $y_1$ etc by weighting the vector elements appropriately to obtain a least squares fit computed over all training data. The QR decomposition approach and its implementation on a systolic array provide a least squares solution which is mathematically exact. Against this, for some purposes it may prove to be computationally onerous, since for example the number of processing cells increases rapidly as the number of centres used in a problem increases. One alternative fitting technique employs the Widrow LMS algorithm. This technique together with an apparatus for its implementation are disclosed in British Patent No. 2,143,378B. It exhibits inferior convergence and accuracy properties as compared to the QR decomposition approach, but requires reduced signal processing circuitry. More generally, fitting techniques other than least mean squares approaches are also known and may be used to fit training $\underline{\phi}$ vectors to training answers. Known fitting techniques include for example those based on minimisation of the so-called $L_1$ norm, in which a sum of moduli of differences is minimised (as opposed to a sum of squared differences in the QR approach). Alternative optimisation methods include maximum entropy and maximum likelihood approaches.

We claim:

1. An heuristic processor comprised of:

(1) non-linear transforming means for producing a respective training $\underline{\phi}$ vector from each member of a training data set on the basis of a set of centers, each training data set member having a displacement from each of said centers, where a norm of the displacement is calculable from each of said displacements, and each element of a $\underline{\phi}$ vector consisting of a non-linear transformation of the norm of the displacement of the associated training data set member from a respective center set member, (2) processing means for combining training $\underline{\phi}$ vector elements in a manner producing a training fit to a set of training answers, and (3) means for generating result estimate values, each of said estimate values consisting of a combination of the elements of a respective $\underline{\phi}$ vector produced from test data, each combination being at least equivalent to a summation of vector elements weighted in accordance with the training fit wherein the transforming means is a digital arithmetic unit computing differences between training data vector elements and corresponding center vector elements and for summing the squares of such differences associated with each data vector-center vector pair, and for converting each sum to a value in accordance with the non-linear transformation and for providing a respective training $\phi$ vector element, wherein the processing means is a systolic array of processing cells for implementing a rotation algorithm to provide QR decomposition of a $\Phi$ matrix $\phi$ vector rows and least squares fitting to the training answer set, the algorithm involving computation and application of rotation parameters and storage of updated decomposition matrix elements by the processing cells, and wherein the systolic array has a first row of processing cells arranged to receive $\phi$ vectors extended by training answers, each first row cell being arranged for input of a respective element of each extended vector.

2. A processor according to claim 1 wherein the processing cells are boundary and internal cells connected to form rows and columns of the systolic array and:

(1) each row begins with a boundary cell and continues with at least one internal cells which diminish in number down the array by one per row, (2) the first array row contains a number of boundary and internal cells equal to the number of elements in an extended vector, (3) the columns comprise a first column containing a boundary cell only, subsequent columns containing a respective boundary cell surmounted by numbers of internal cells increasing from one by one per column, and at least one outer column of internal cells arranged to receive training answer input, (4) the boundary and internal cells are arranged to compute rotation parameters from input values and apply them to input values respectively, and to store respective updated decomposition matrix elements for use in such computation, and (5) the cells have row and column nearest neighbour connections providing for rotation parameters to pass along rows and rotated values to pass down columns.

3. A processor according to claim 2 further including a multiplier cell (M) for multiplying cumulatively rotated values output from an outer column of internal cells by cumulatively multiplied and relatively delayed parameters generated by boundary cells in appropriate form for computing least squares residuals arising between combined elements of training data $\phi$ vectors and their respective training answers.

4. A processor according to claim 1, wherein the means for generating result estimates values includes means for switching the systolic array to a test mode of operation in which decomposition matrix element update and training answer input are suppressed.

5. An heuristic processor comprised of:

(1) non-linear transforming means for producing a respective training $\phi$ vector from each member of a training data set on the basis of a set of centers, each training data set member having a displacement from each of said centers, where a norm of the displacement is calculable from each of said displacements, and each element of a $\phi$ vector consisting of a non-linear transformation of the norm of the displacement of the associated training data set member from a respective center set member, (2) processing means for combining training $\phi$ vector elements in a manner producing a training fit to a set of training answers, and (3) means for generating result estimate values, each of said estimate values consisting of a combination of the elements of a respective $\phi$ vector produced from test data, each combination being at least equivalent to a summation of vector elements weighted in accordance with the training fit, wherein the heuristic processor consists at least partly of processing devices linked by connecting means incorporating clocked latches for data storage and propagation.

6. An heuristic processor comprised of:

(1) non-linear transforming means for producing a respective training $\phi$ vector from each member of a training data set on the basis of a set of centers, each training data set member having a displacement from each of said centers, where a norm of the displacement is calculable from each of said displacements, and each element of a $\phi$ vector consisting of a non-linear transformation of the norm of the displacement of the associated training data set member from a respective center set member, (2) processing means for combining training $\phi$ vector elements in a manner producing a training fit to a set of training answers, said processing means consisting at least partly of programmed transputers interconnected together by single-bit data links and for performing calculation operations in parallel with one another, and (3) means for generating result estimate values, each of said estimate values consisting of a combination of the elements of a respective $\phi$ vector produced from test data, each combination being at least equivalent to a summation of vector elements weighted in accordance with the training fit.

7. An heuristic processor comprised of:

(1) non-linear transforming means for producing a respective training $\phi$ vector from each member of a training data set on the basis of a set of centers, each training data set member having a displacement from each of said centers, where a norm of the displacement is calculable from each of said displacements, and each element of a $\phi$ vector consisting of a non-linear transformation of the norm of the displacement of the associated training data set member from a respective center set member, (2) an electronically addressable memory incorporated in the transforming means, the memory "receiving" addresses in fixed point arithmetic format and "providing" output in floating point arithmetic format in the course of producing each said training $\phi$ vector in floating point format, (3) processing means for combining training $\phi$ vector elements in a manner producing a training fit to a set of training answers, and (4) means for generating result estimate values, each of said estimate values consisting of a combination of the elements of a respective $\phi$ vector produced from test data, each combination being at least equivalent to a summation of vector elements weighted in accordance with the training fit.

8. An heuristic processor comprised of:

(1) non-linear transforming means for producing a respective training $\phi$ vector from each member of a training data set on the basis of a set of centers, each training data set member having a displacement from each of said centers, where a norm of the displacement is calculable from each of said displacements, and each element of a $\underline{\phi}$ vector consisting of a non-linear transformation of the norm of the displacement of the associated training data set member from a respective center set member, (2) processing means for combining training $\underline{\phi}$ vector elements in a manner producing a training fit to a set of training answers, (3) means for generating result estimate values, each of said estimate values consisting of a combination of the elements of a respective $\underline{\phi}$ vector produced from test data, each combination being at least equivalent to a summation of vector elements weighted in accordance with the training fit, wherein the non-linear transforming means, the processing means and the means for generating result estimate values are interlinked by multibit buses and single-bit lines for data transmission purposes.

9. An heuristic processor comprised of:

(1) non-linear transforming means for producing a respective training $\underline{\phi}$ vector from each member of a training data set on the basis of a set of centers, each training data set member having a displacement from each of said centers, where a norm of the displacement is calculable from each of said displacements, and each element of a $\underline{\phi}$ vector consisting of a non-linear transformation of the norm of the displacement of the associated training data set member from a respective center set member, (2) an electronically addressable memory incorporated in the transforming means, the memory being for "receiving" addresses in fixed point arithmetic format and "providing" output in floating point arithmetic format in the course of producing each said training $\underline{\phi}$ vector in floating point format, said output in each case being a non-linear transformation of the respective address value, (3) processing means for combining training $\underline{\phi}$ vector elements in a manner producing a training fit to a set of training answers, and (4) means for generating result estimate values, each of said estimate values consisting of a combination of the elements of a respective $\underline{\phi}$ vector produced from test data, each combination being at least equivalent to a summation of vector elements weighted in accordance with the training fit.

*10. An heuristic processor comprised of:*

*(1) a non-linear transformation device producing a respective training $\underline{\phi}$ vector from each member of a training data set on the basis of a set of centers, each training data set member having a displacement from each of said centers, where a norm of the displacement is calculable from each of said displacements, and each element of a $\underline{\phi}$ vector consisting of a non-linear transformation of the norm of the displacement of the associated training data set member from a respective center set member,*

*(2) a combining processor combining training $\underline{\phi}$ vector elements in a manner producing a training fit to a set of training answers, and*

*(3) a result estimate value generator generating estimate values, each of said estimate values consisting of a combination of the elements of a respective $\underline{\phi}$ vector produced from test data, each combination being at least equivalent to a summation of vector elements weighted in accordance with the training fit, wherein the heuristic processor consists at least partly of processing devices linked by connectors incorporating clocked latches for data storage and propagation.*

*11. An heuristic processor comprised of:*

*a non-linear transformation device producing a respective training $\underline{\phi}$ vector from each member of a training data set on the basis of a set of centers, each training data set member having a displacement from each of said centers, where a norm of the displacement is calculable from each of said displacements, and each element of a $\underline{\phi}$ vector consisting of a non-linear transformation of the norm of the displacement of the associated training data set member from a respective center set member,*

*electronically addressable memories incorporated in the transformation device, the memories "receiving" addresses in fixed point arithmetic format and "providing" output in floating point arithmetic format in the course of producing said elements of training $\underline{\phi}$ vectors in floating point format, and*

*a combining processor combining training $\underline{\phi}$ vector elements in a manner producing a training fit to a set of training answers in a form suitable for enabling result estimate values to be generated,*

*each of said estimate values consisting of a combination of the elements of a respective $\underline{\phi}$ vector produced from test data, each combination being at least equivalent to a summation of vector elements weighted in accordance with the training fit.*

*12. An heuristic processor comprised of:*

*(1) a non-linear transformation device producing a respective training $\underline{\phi}$ vector from each member of a training data set on the basis of a set of centers, each training data set member having a displacement from each of said centers, where a norm of the displacement is calculable from each of said displacements, and each element of a $\underline{\phi}$ vector consisting of a non-linear transformation of the norm of the displacement of the associated training data set member from a respective center set member,*

*(2) a combining processor combining training $\underline{\phi}$ vector elements in a manner producing a training fit to a set of training answers, and*

*(3) a result estimate value generator generating estimate values, each of said estimate values consisting of a combination of the elements of a respective $\underline{\phi}$ vector produced from test data, each combination being at least equivalent to a summation of vector elements weighted in accordance with the training fit,*

*wherein the transformation device, the combining processor and the result estimate value generator are interlinked by multibit buses and single-bit lines for data transmission purposes.*

*13. An heuristic processor comprised of:*

*a non-linear transformation device producing a respective training $\underline{\phi}$ vector from each member of a training data set on the basis of a set of centers, each training data set member having a displacement from each of said centers, where a norm of the displacement is calculable from each of said displacements, and each element of a $\underline{\phi}$ vector consisting of a non-linear transformation of the norm of the displacement of the associated training data set member form a respective center set member,*

*electronically addressable memories incorporated in the transformation device, the memories "receiving"*

*addresses in fixed point arithmetic format and "providing" output in floating point arithmetic format in the course of producing said elements of training $\underline{\phi}$ vectors in floating point format, said output in each case being a non-linear transformation of the respective address value,*

*a combining processor combining training $\underline{\phi}$ vector elements in a manner producing a training fit to a set of training answers in a form suitable for enabling result estimate values to be generated,*

*each of said estimate values consisting of a combination of the elements of a respective $\underline{\phi}$ vector produced from test data, each combination being at least equivalent to a summation of vector elements weighted in accordance with the training fit.*

*14. An heuristic processor comprised of:*

*a non-linear transformation device producing a respective training $\underline{\phi}$ vector from each member of a training data set on the basis of a set of centers, each training data set member having a displacement from each of said centers, where a norm of the displacement is calculable from each displacement, and each element of a $\underline{\phi}$ vector consisting of a non-linear transformation of the norm of the displacement of the associated training data set member from which said training $\underline{\phi}$ vector is produced,*

*a processor which weights and combines training $\underline{\phi}$ vector elements and produces a training fit to a set of training answers, and*

*a result estimate value generator generating estimate values and producing a respective test $\underline{\phi}$ vector from each ember of a set of test data, each test data set member having a displacement from each of said centers, where a norm of said test data set member displacement is calculable from each test data set member displacement and each element of a test $\underline{\phi}$ vector consisting of said non-linear transformation of said norm of said test data set member displacement, each of said estimate values consisting of a combination being at least equivalent to a summation of vector elements weighted in accordance with the training fit.*

*15. A processor according to claim 14, wherein the transformation device computes differences between training data vector elements and corresponding center elements, sums the squares of such differences associated with each center-data vector pair, converts each sum to a value in accordance with the non-linear transformation and provides a respective training $\underline{\phi}$ vector element.*

*16. An heuristic processor comprised of:*

*a non-linear transformation device producing a respective training $\underline{\phi}$ vector from each member of a training data set on the basis of a set of centers, each training data set member having a displacement from each of said centers, where a norm of the displacement is calculable from each displacement, and each element of a $\underline{\phi}$ vector consisting of a non-linear transformation of the norm of the displacement of the associated training data set member from which said training $\underline{\phi}$ vector is produced,*

*a processor which weights and combines training $\underline{\phi}$ vector elements and produces a training fit to a set of training answers, and*

*a result estimate value generator generating estimate values and producing a respective test $\underline{\phi}$ vector from each member of a set of test data, each test data set member having a displacement from each of said centers, where a norm of said test data set member displacement is calculable from each test data set member displacement and each element of a test $\underline{\phi}$ vector consisting of said non-linear transformation of said norm of said test data set member displacement, each of said estimate values consisting of a combination of the elements of a respective test $\underline{\phi}$ vector and each said combination being at least equivalent to a summation of vector elements weighted in accordance with the training fit, wherein said processor comprises programmed processing devices for performing calculation operations in parallel with one another.*

*17. An heuristic processor comprised of:*

*a non-linear transformation device producing a respective training $\underline{\phi}$ vector from each member of a training data set on the basis of a set of centers, each training data set member having a displacement from each of said centers, where a norm of the displacement is calculable from each displacement, and each element of a $\underline{\phi}$ vector consisting of a non-linear transformation of the norm of the displacement of the associated training data set member from which said training $\underline{\phi}$ vector is produced,*

*a processor which weights and combines training $\underline{\phi}$ vector elements and produces a training fit to a set of training answers, wherein said processor comprises a digital electronic processor for performing calculations in floating point arithmetic, and*

*a result estimate value generator generating estimate values and producing a respective test $\underline{\phi}$ vector from each member of a set of test data, each test data set member having a displacement from each of said centers, where a norm of said test data set member displacement is calculable from each test data set member displacement and each element of a test $\underline{\phi}$ vector consisting of said non-linear transformation of said norm of said test data set member displacement, each of said estimate values consisting of a combination of the elements of a respective test $\underline{\phi}$ vector and each said combination being at least equivalent to a summation of vector elements weighted in accordance with the training fit.*

*18. An heuristic processor comprised of:*

*a non-linear transformation device producing a respective training $\underline{\phi}$ vector from each member of a training data set on the basis of a set of centers, each training data set member having a displacement from each of said centers, where a norm of the displacement is calculable from each displacement, and each element of a $\underline{\phi}$ vector consisting of a non-linear transformation of the norm of the displacement of the associated training data set member from which said training $\underline{\phi}$ vector is produced,*

*a processor which weights and combines training $\underline{\phi}$ vector elements and produces a training fit to a set of training answers, and*

*a result estimate value generator generating estimate values and producing a respective test $\underline{\phi}$ vector from each member of a set of test data, each test data set member having a displacement from each of said centers, where a norm of said test data set member displacement is calculable from each test data set member displacement and each element of a test $\underline{\phi}$ vector consisting of said non-linear transformation of said norm of said test data set member displacement, each of said estimate values consisting of a combina-*

*tion of the elements of a respective test $\underline{\phi}$ vector and each said combination being at least equivalent to a summation of vector elements weighted in accordance with the training fit.*

*19. An heuristic processor comprised of:*

*a non-linear transformation device producing a respective training $\underline{\phi}$ vector from each member of a training data set on the basis of a set of centers, each training data set member having a displacement from each of said centers, where a norm of the displacement is calculable from each displacement, and each element of a $\underline{\phi}$ vector consisting of a non-linear transformation of the norm of the displacement of the associated training data set member from which said training $\underline{\phi}$ vector is produced,*

*a processor which weights and combines training $\underline{\phi}$ vector elements and produces a training fit to a set of training answers, and*

*a result estimate value generator generating estimate values and producing a respective test $\underline{\phi}$ vector from each member of a set of test data, each test data set member having a displacement from each of said centers, where a norm of said test data set member displacement is calculable from each test data set member displacement and each element of a test $\underline{\phi}$ vector consisting of said non-linear transformation of said norm of said test data set member displacement, each of said estimate values consisting of a combination of the elements of a respective test $\underline{\phi}$ vector and each said combination being at least equivalent to a summation of vector elements weighted in accordance with the training fit, wherein the transformation device and the processor incorporate digital electronic signal processing devices controlled by clock signals.*

*20. An heuristic processor comprised of:*

*a non-linear transformation device producing a respective training $\underline{\phi}$ vector from each member of a training data set on the basis of a set of centers, each training data set member having a displacement from each of said centers, where a norm of the displacement is calculable from each displacement, and each element of a $\underline{\phi}$ vector consisting of a non-linear transformation of the norm of the displacement of the associated training data set member from which said training $\underline{\phi}$ vector is produced,*

*a processor which weights and combines training $\underline{\phi}$ vector elements and produces a training fit to a set of training answers and comprises digital electronic signal processing devices for storing processing results for output after a delay, and*

*a result estimate value generator generating estimate values and producing a respective test $\underline{\phi}$ vector from each member of a set of test data, each test data set member having a displacement from each of said centers, where a norm of said test data set member displacement is calculable from each test data set member displacement and each element of a test $\underline{\phi}$ vector consisting of said non-linear transformation of said norm of said test data set member displacement, each of said estimate values consisting of a combination of the elements of a respective test $\underline{\phi}$ vector and each said combination being at least equivalent to a summation of vector elements weighted in accordance with the training fit.*

*21. A method of training an heuristic processor, wherein the heuristic processor consists at least partly of processing devices linked by connectors incorporating clocked latches for data storage and propagation, said method comprising the steps of:*

*(1) producing a respective training $\underline{\phi}$ vector from each member of a training data set on the basis of a set of centers, each training data set member having a displacement from each of said centers, where a norm of the displacement is calculable from each of said displacements, and each element of a $\underline{\phi}$ vector consisting of a non-linear transformation of the norm of the displacement of the associated training data set member from a respective center set member, and*

*(2) combining training $\underline{\phi}$ vector elements in a manner producing a training fit to a set of training answers,*

*each of said estimate values consisting of a combination of the elements of a respective $\underline{\phi}$ vector produced from test data, each combination being at least equivalent to a summation of vector elements weighted in accordance with the training fit.*

*22. A method of training an heuristic processor, said method comprising the steps of:*

*(1) producing a respective training $\underline{\phi}$ vector from each member of a training data set on the basis of a set of centers, each training data set member having a displacement from each of said centers, where a norm of the displacement is calculable from each of said displacements, and each element of a $\underline{\phi}$ vector consisting of a non-linear transformation of the norm of the displacement of the associated training data set member from a respective center set member said non-linear transformation being implemented with the aid of electronically addressable memories responsive to an input address in fixed point arithmetic format by providing output of a $\underline{\phi}$ vector element as a transformation of that address in floating point format, and*

*(2) combining training $\underline{\phi}$ vector elements in a manner producing a training fit to a set of training answers in a form suitable for enabling result estimate values to be generated, each of said estimate values consisting of a combination of the elements of a respective $\underline{\phi}$ vector produced from test data, each combination being at least equivalent to a summation of vector elements weighted in accordance with the training fit.*

*23. A method of training of heuristic processor, said processor including a non-linear transformation device, a combining processor and a result estimate value generator are interlinked by multibit buses and single-bit lines for data transmission purposes, said method comprising the steps of:*

*(1) producing, in said non-linear transformation device, a respective training $\underline{\phi}$ vector from each member of a training data set on the basis of a set of centers, each training data set member having a displacement from each of said centers, where a norm of the displacement is calculable from each of said displacements, and each element of a $\underline{\phi}$ vector consisting of a non-linear transformation of the norm of the displacement of the associated training data set member from a respective center set member, and*

*(2) combining, in said combining processor, training $\underline{\phi}$ vector elements in a manner producing a training fit to a set of training answers in a form suitable for enabling result estimate values to be generated, each of said estimate values consisting of a combination of the elements of a respective $\underline{\phi}$ vector produced from test data, each combination being at least equivalent to a summation of vector elements weighted in accordance with the training fit.*

*24. A method of training an heuristic processor, said method comprising the steps of:*

*producing a respective training $\underline{\phi}$ vector from each member of a training data set on the basis of a set of centers, each training data set member having a displacement from each of said centers, where a norm of the displacement is calculable from each of said displacements, and each element of a $\underline{\phi}$ vector consisting of a non-linear transformation of the norm of the displacement of the associated training data set member from a respective center set member, said non-linear transformation being implemented with the aid of memory means which, when supplied with an input address in fixed point arithmetic format, provides output of an element of each said training $\underline{\phi}$ vector as a transformation of that address in floating point format, and*

*combining training $\underline{\phi}$ vector elements in a manner producing a training fit to a set of training answers in a form suitable for enabling result estimate values to be generated, each of said estimate values consisting of a combination of the elements of a respective $\underline{\phi}$ vector produced from test data, each combination being at least equivalent to a summation of vector elements weighted in accordance with the training fit.*

*25. A method of training an heuristic processor, said method comprising the steps of:*

*producing a respective training $\underline{\phi}$ vector from each member of a training data set on the basis of a set of centers, each training data set member having a displacement from each of said centers, where a norm of the displacement is calculable from each displacement, and each element of a $\underline{\phi}$ vector consisting of a non-linear transformation of the norm of the displacement of the associated training data set member from which said training $\underline{\phi}$ vector is produced, said non-linear transformation being implemented with the aid of memory means which, when supplied with an input address in fixed point arithmetic format, provides output of an element of each said training $\underline{\phi}$ vector as a transformation of that address in floating point format, and*

*weighting and combining training $\underline{\phi}$ vector elements and producing a training fit to a set of training answers in a form suitable for enabling result estimate values to be generated, each of said estimate values consisting of a combination of the elements of a respective $\underline{\phi}$ vector produced from test data, each combination being at least equivalent to a summation of vector elements weighted in accordance with the training fit.*

*26. A method of training an heuristic processor, according to claim 25, wherein said first producing step includes the steps of:*

*computing differences between training vector elements and corresponding center elements;*

*summing the squares of such differences associated with each center-data vector pair;*

*converting each sum to a value in accordance with the non-linear transformation and*

*providing a respective training $\underline{\phi}$ vector element.*

*27. A method of training an heuristic processor, wherein said processor comprises a programmed processing device for performing calculation operations in parallel with one another, said method comprising the steps of:*

*producing a respective training $\underline{\phi}$ vector from each member of a training data set on the basis of a set of centers, each training data set member having a displacement from each of said centers, where a norm of the displacement is calculable from each displacement, and each element of a $\underline{\phi}$ vector consisting of a non-linear transformation of the norm of the displacement of the associated training data set member from which said training $\underline{\phi}$ vector is produced, and*

*weighting and combining training $\underline{\phi}$ vector elements and producing a training fit to a set of training answers in a form suitable for enabling result estimate values to be generated, each of said estimate values consisting of a combination of the elements of a respective $\underline{\phi}$ vector produced from test data, each said combination being at least equivalent to a summation of vector elements weighted in accordance with the training fit.*

*28. A method of training an heuristic processor, wherein said processor comprises a digital electronic processor for performing calculations in floating point arithmetic, said method comprising the steps of:*

*producing a respective training $\underline{\phi}$ vector from each member of a training data set on the basis of a set of centers, each training data set member having a displacement from each of said centers, where a norm of the displacement is calculable from each displacement, and each element of a $\underline{\phi}$ vector consisting of a non-linear transformation of the norm of the displacement of the associated training data set member from which said training $\underline{\phi}$ vector is produced, and*

*weighting and combining training $\underline{\phi}$ vector elements and producing a training fit to a set of training answers in a form suitable for enabling result estimate values to be generated, each of said estimate values consisting of a combination of the elements of a respective $\underline{\phi}$ vector produced from test data, and each said combination being at least equivalent to a summation of vector elements weighted in accordance with the training fit.*

*29. A method of training an heuristic processor, said method comprising the steps of:*

*producing a respective training $\underline{\phi}$ vector from each member of a training data set on the basis of a set of centers, each training data set member having a displacement from each of said centers, where a norm of the displacement is calculable from each displacement, and each element of a $\underline{\phi}$ vector consisting of a non-linear transformation of the norm of the displacement of the associated training data set member from which said training $\underline{\phi}$ vector is produced, and*

*weighting and combining training $\underline{\phi}$ vector elements and producing a training fit to a set of training answers in a form suitable for enabling result estimate values to be generated, each of said estimate values consisting of a combination of the elements of a respective $\underline{\phi}$ vector produced from test data, and each said combination being at least equivalent to a summation of vector elements weighted in accordance with the training fit.*

*30. A method of training an heuristic processor, said processor including a non-linear transformation device and said processor and transformation device incorporate digital electronic signal processing devices controlled by clock signals, said method comprising the steps of:*

*producing, in said non-linear transformation device, a respective training $\underline{\phi}$ vector form each member of a training data set on the basis of a set of centers, each training data set member having a displacement from each of said centers, where a norm of the displacement is calculable from each displacement, and each element of a $\underline{\phi}$ vector consisting of a non-linear transformation*

*of the norm of the displacement of the associated training data set member from which said training $\underline{\phi}$ vector is produced, and*

*weighting and combining training $\underline{\phi}$ vector elements and producing a training fit to a set of training answers in a form suitable for enabling result estimate values to be generated, each of said estimate values consisting of a combination of the elements of a respective $\underline{\phi}$ vector produced from test data, and each said combination being at least equivalent to a summation of vector elements weighted in accordance with the training fit.*

*31. A method of training an heuristic processor, said method comprising the steps of:*

*producing a respective training $\underline{\phi}$ vector from each member of a training data set on the basis of a set of centers, each training data set member having a displacement from each of said centers, where a norm of the displacement is calculable from each displacement, and each element of a $\underline{\phi}$ vector consisting of a non-linear transformation of the norm of the displacement of the associated training data set member from which said training $\underline{\phi}$ vector is produced, and*

*weighting and combining training $\underline{\phi}$ vector elements and producing a training fit to a set of training answers in a digital electronic signal processing device for storing processing results for output after a delay in a form suitable for enabling result estimate values to be generated, each of said estimate values consisting of a combination of the elements of a respective $\underline{\phi}$ vector produced from test data, and each of said combination being at least equivalent to a summation of vector elements weighted in accordance with the training fit.*

*32. A method of estimating results using an electronic processing device, the device including a means for the non-linear transformation of data, for combining elements of transformed data, and for weighting data, said method comprising arranging said electronic device to execute the steps of:*

*(1) producing training $\underline{\phi}$ vectors from each member of a training data set on the basis of a set of centers, each training data set member having a displacement from each of said centers, where a norm of the displacement is calculable from each of said displacements, and each element of a $\underline{\phi}$ vector consisting of a non-linear transformation of the norm of the displacement of the associated training data set member from a respective center set member,*

*(2) combining training $\underline{\phi}$ vector elements in a manner producing a training fit to a set of training answers, and*

*(3) generating result estimate values, each of said estimate values comprising a combination of weighted elements of a respective $\underline{\phi}$ vector produced from test data, said weighting in accordance with the training fit.*

*33. A method of estimating results using first and second electronic processing devices, said first electronic processing device including a means for the non-linear transformation of data and for combining elements of transformed data, and said second electronic processing device including means for producing weighted combinations of vector elements, said method comprising arranging said first electronic processing device to execute the steps of:*

*(1) producing training $\underline{\phi}$ vectors from each member of a training data set on the basis of a set of centers, each training data set member having a displacement from each of said centers, where a norm of the displacement is calculable from each of said displacements, and each element of a $\underline{\phi}$ vector consisting of a non-linear transformation of the norm of the displacement of the associated training data set member from a respective center set member,*

*(2) combining training $\underline{\phi}$ vector elements in a manner producing a training fit to a set of training answers, and said second electronic processing device generating result estimate values, each of said estimate values comprising a combination of weighted elements of a respective $\underline{\phi}$ vector produced from test data, said weighting in accordance with the training fit produced by said first electronic processing device.*

* * * * *